US012615700B2

(12) United States Patent
Kim et al.

(10) Patent No.: US 12,615,700 B2
(45) Date of Patent: Apr. 28, 2026

(54) COOKING APPLIANCE

(71) Applicant: LG ELECTRONICS INC., Seoul (KR)

(72) Inventors: Haemin Kim, Seoul (KR); Wanje Cho, Seoul (KR); Dongmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 716 days.

(21) Appl. No.: 17/957,793

(22) Filed: Sep. 30, 2022

(65) Prior Publication Data

US 2023/0132856 A1 May 4, 2023

(30) Foreign Application Priority Data

Oct. 28, 2021 (KR) ........................ 10-2021-0146025
Feb. 3, 2022 (KR) ........................ 10-2022-0013982
Feb. 3, 2022 (KR) ........................ 10-2022-0013984
Apr. 12, 2022 (KR) ........................ 10-2022-0045019

(51) Int. Cl.
*H05B 6/68* (2006.01)
*H05B 6/64* (2006.01)

(52) U.S. Cl.
CPC ............. *H05B 6/68* (2013.01); *H05B 6/6447* (2013.01)

(58) Field of Classification Search
CPC ........ F24C 15/006; F24C 15/02; F24C 7/085; H05B 6/6414; H05B 6/642; H05B 6/6435; H05B 6/6447; H05B 6/68; H05B 6/76
USPC ....... 219/702, 739, 740, 741, 742, 743, 744, 219/391, 392, 399, 722, 724, 679, 681; 126/194, 198, 200, 21 A, 299 R, 299 D; 99/399, 473, 476, 341, 324
See application file for complete search history.

(56) References Cited

U.S. PATENT DOCUMENTS 10,440,245 B1 10/2019 Johnson et al.
2019/0260915 A1 8/2019 Armstrong
2020/0056790 A1 2/2020 Armstrong et al.
2021/0401223 A1 12/2021 Han et al.

FOREIGN PATENT DOCUMENTS

CN 201983308 U 9/2011
CN 209165483 U * 7/2019
CN 209415524 U 9/2019
CN 111608546 A 9/2020
(Continued)

OTHER PUBLICATIONS

Translation of WO2019/218685A1, "Smart Microwave Oven Having Food Material Collection Function" , Nov. 21, 2019, By WIPO (Year: 2019).*

*Primary Examiner* — Quang T Van
(74) *Attorney, Agent, or Firm* — Bryan Cave Leighton Paisner LLP

(57) ABSTRACT

A cooking appliance having a main body formed with a cavity, and a door opening and closing the cavity, wherein the door includes a display module disposed on the front of the door, a cooling flow path unit disposed behind the display module and having a flow path through which air for cooling flows formed therein, a shielding unit disposed behind the cooling flow path unit and configured to shield electromagnetic waves generated in the main body, and a camera configured to capture at least one place among the front or a lower portion of the door, or the cavity.

16 Claims, 25 Drawing Sheets

(56) References Cited

FOREIGN PATENT DOCUMENTS

| | | | |
|---|---|---|---|
| KR | 10-2008-0070408 | A | 7/2008 |
| KR | 10-2018-0025787 | A | 3/2018 |
| WO | 2019218685 | A1 | 11/2019 |
| WO | 2021187660 | A1 | 11/2019 |
| WO | 2021040095 | A1 | 3/2021 |

* cited by examiner

COOKING APPLIANCE

CROSS-REFERENCE TO RELATED APPLICATION

This application claims priority to and benefit of Korean Patent Application Nos. 10-2021-0146025, filed on Oct. 28, 2021, 10-2022-0013982, filed on Feb. 3, 2022, 10-2022-0013984, filed on Feb. 3, 2022, and 10-2022-0045019, filed on Apr. 12, 2022 which are hereby incorporated by reference in their entirety for all purposes as if fully set forth herein.

BACKGROUND

1. Field of the Invention

The present disclosure relates to a cooking appliance, and more specifically, to a cooking appliance installed above a heating cooking device.

2. Discussion of Background Art

The content described in this section provides background information on the present disclosure and does not constitute the related art.

A cooking appliance is a home appliance that cooks food using microwaves and/or heater heat, which are type(s) of electromagnetic waves. The cooking appliance may be generally composed of a cavity, which is a space in which food is placed and cooked, and a door that opens and closes to provide access to the cavity.

When the cooking appliance is installed indoors, it is necessary to consider the efficient use of the cooking appliance, the saving of installation space, etc. Accordingly, the cooking appliance may be disposed at a location adjacent to a heating cooking device, for example, a heating-type oven, a gas range, etc. For example, the cooking appliance may be disposed above the heating cooking device.

When the cooking appliance is disposed above the heating cooking device, a user can conveniently cook food by reducing their movement in an environment where the cooking appliance and the heating cooking device are adjacent to each other. In addition, heat, oil mist, etc. generated from the heating cooking device can be discharged to the outside using the cooking appliance as a hood.

In a state in which the cooking appliance is disposed above the heating cooking device, the heat, oil mist, etc. generated from the heating cooking device disposed below the cooking appliance may adversely affect an operation of the cooking appliance.

For example, a display unit may be mounted on a front surface of a door provided in the cooking appliance in order to provide various types of information to the user. The user may know a cooking state of the cooked food through the display unit.

In addition, when the display unit is connected to another home appliance and serves as a hub of the home appliance, information other than cooking of food may be obtained through the display unit. In addition, the user may input a command required for cooking and other various commands into the display unit through a touch display method.

In the state in which the cooking appliance is disposed above the heating cooking device, the heat, oil mist, etc. generated from the heating cooking device may penetrate into the display unit and/or other components mounted on the door.

It is necessary to protect the display unit and other parts mounted on the door of the cooking appliance from being damaged or malfunctioning due to such contaminants, heat, oil mist, etc.

In addition, it is necessary to allow the user to see the inside of the cavity in order to provide convenience to the user. In order to see the cavity, a camera may be provided on the door of the cooking appliance and play an image of the inside of the cavity on the display unit.

SUMMARY OF THE INVENTION

The present disclosure provides a cooking appliance having a display unit provided on a front surface in order to provide various types of information to the user.

The present disclosure provides a cooking appliance having a display unit provided on a door of the cooking appliance using microwaves.

The present disclosure provides a cooking appliance having a structure capable of showing a situation inside a cavity to the user during a cooking process by capturing the inside of the cavity.

The present disclosure provides a cooking appliance having a camera provided to be easily detachable to a door, and capturing a image(s) inside a cavity.

The present disclosure provides a cooking appliance having a structure capable of suppressing heat, oil mist, etc. generated from a heating cooking device disposed thereunder from penetrating into a door of the cooking appliance.

The present disclosure provides a cooking appliance having a structure capable of suppressing a display unit from being contaminated by oil mist.

The present disclosure provides a cooking appliance having a cooling structure of a display module attached to a front surface of a door.

The present disclosure provides a cooking appliance having a structure capable of suppressing heat, oil mist, etc. from penetrating into a door by forming an air curtain outside the door.

The present disclosure provides a cooking appliance having a door equipped with a display unit on a front surface thereof and formed with a cooling structure for cooling the display unit and a microwave shielding structure for preventing microwave leakage.

According to one embodiment of the present disclosure, a cooking appliance may include a main body formed with a cavity, and a door opening and closing the cavity.

The door may include a display module disposed in front of the door, a cooling flow path unit disposed behind the display module that has a flow path through which air for cooling flows formed therein, and a shielding unit disposed behind the cooling flow path unit that is configured to shield electromagnetic waves generated from the main body.

The air flowing through the cooling flow path unit may be branched from an inside of the cooling flow path unit to be discharged to the top and bottom of the display module.

In the cooking appliance according to this embodiment, a supporter and a third camera may be mounted on an angle adjustment unit. The third camera may be mounted on the supporter, and the supporter may be mounted on one side surface of the angle adjustment unit.

Accordingly, the angle adjustment unit may be formed with a through portion formed so that a gaze (e.g., observation) of the third camera passes through a bracket. The gaze of the third camera may look into a cavity through the through portion.

The angle adjustment unit may be provided to have an inclination with respect to a front-rear direction of the door. Accordingly, the supporter and the third camera mounted on the angle adjustment unit may also be provided to be inclined with respect to the front-rear direction of the door, and a gaze direction of the third camera may also be disposed to be inclined with respect to the front-rear direction of the door.

Specifically, the gaze direction of the third camera may form an acute angle with the front-rear direction of the door, and the third camera may be provided to look in a downward direction at the cavity disposed behind the door.

The third camera may be mounted at a location spaced upward from a center of the frame, and the gaze direction may form an acute angle with the front-rear direction of the door. Accordingly, the third camera may capture an image of food while looking down at the food placed in the cavity.

In the cooking appliance according to this embodiment, as the blowing fan rotates, the external air may flow into the door through the inlet of the air guide, and flow to be discharged to the outside of the door through the first outlet and the second outlet.

The air forcibly flowing by the blowing fan may specifically have the following flow path of airflow:

The air may flow into the door from a first aperture of the outer panel and the inlet provided at a location corresponding thereto. The air flowing into the door may flow in a downward direction from the door to flow into the blowing fan.

The air may pass through the blowing fan in a front-rear direction of the door. At this time, the air may pass through the mounting hole of the air guide while passing through the blowing fan. The flow direction of the air may be changed from an up-down direction to a front-rear direction of the door in the blowing fan.

As the front of the mounting hole is closed by the display unit, the air passed through the mounting hole may be branched in front of the air guide in the up-down direction.

A part of the branched air may flow in an upper direction of the door to be discharged through the first outlet. Another part of the branched air may flow in a downward direction of from the door to be discharged through the second outlet.

Air branched from the first outlet and the second outlet may surround the entire door. In particular, the branched air may surround a front portion of the door. This structure can allow the air discharged through the first outlet and the second outlet to form the air curtain on the door, thereby effectively suppressing the heat and oil mist generated from the heating cooking device disposed below the cooking appliance from permeating into the door.

In the cooking appliance according to this embodiment, a mounting member may include a first piece and a second piece. The first piece may be provided to protrude from a body, and be elastically deformed in a state in which the mounting member is detachable attached to the bracket.

The second piece may be provided to protrude from an end of the first piece, and suppress the mounting member from being separated from the bracket in a state in which the mounting member is fitted into the bracket.

The bracket may be formed with an insertion hole into which the mounting member may be inserted and fitted at locations corresponding to the first piece and the second piece.

The second piece may be formed to be bent from the first piece. When the supporter and the third camera are mounted on the bracket, the first piece may be pressed by a user and thus elastically deformed, and accordingly, the second piece may be fitted into the insertion hole.

When the supporter is completely mounted on the bracket, the first piece returns to its original shape. The first piece may function as a stopper preventing the supporter from being separated from the insertion hole. Accordingly, the supporter may be stably mounted on the bracket without being separated from the bracket.

When the supporter is removed from the bracket, the first piece may be pressed by the user and thus elastically deformed, and a location of the second piece may be moved to move out of the insertion hole. Accordingly, the supporter can be easily removed from the bracket.

In the cooking appliance according to the present disclosure, a door may be formed having a display structure, a cooling structure, and an electromagnetic wave shielding structure. The display structure, the cooling structure, and the shielding structure can be coupled with each other to form a slim door. Accordingly, even when all of the display structure, the cooling structure, and the shielding structure are formed on the door, the thickness of the door may not be increased.

In the cooking appliance according to the present disclosure, since the display module is provided on the front of the door, the user is able to know the cooking situation in the cooking appliance via the display module. The display module can also serve as the hub of another home appliance to provide various types of information to the user, thereby enhancing the user's convenience.

In addition, in the cooking appliance according to the present disclosure, the airflow discharged to the outside of the door through the first outlet and the second outlet can form an air curtain, so that the heat and oil mist rising from the heating cooking device disposed below the cooking appliance can be effectively blocked by the air curtain.

Accordingly, various electronic parts including the display unit provided on the door may be suppressed or prevented from being damaged or degraded by the heat and contaminants such as oil mist. In addition, the display unit may be prevented from being contaminated by the heat and the oil mist.

In addition, in the cooking appliance according to the present disclosure, the third camera can be mounted on the bracket formed on the frame, the third camera can capture an image inside the cavity, and the control unit provided in the cooking appliance can display the cooking situation of food placed in the cavity as images. Accordingly, the user can conveniently check the situation in which food is being cooked through the display unit.

In addition, in the cooking appliance according to the present disclosure, the third camera can capture the food placed on the bottom surface of the cavity while looking down at the food, thereby providing the user with the image of the food as a whole. Accordingly, the user can conveniently and easily check the cooking situation of food through the captured image.

In addition, in the cooking appliance according to the present disclosure, the supporter may be provided with the mounting member and the support member disposed at the locations spaced apart from each other. The mounting member may be provided to be easily detachable from the bracket of the frame. Thus, the supporter may be brought into close contact with the bracket of the frame to support the support member, thereby suppressing the support member from shaking due to external vibration.

Accordingly, the supporter can be easily detached from the frame, thereby easily performing the task of mounting the third camera on the frame, or replacement or repair work. In addition, the third camera may be suppressed or prevented from being shaking due to external vibration in the state in which the third camera is mounted on the frame, thereby improving the capturing quality of the third camera.

In addition, in the cooking appliance according to the present invention, the airflow discharged to the outside of the door through the first outlet and the second outlet provided in the door can form an air curtain, thereby effectively blocking the heat and oil mist rising from the heating cooking device disposed below the cooking appliance.

Accordingly, various electronic parts including the display unit provided on the door may be suppressed or prevented from being damaged or degraded by the heat and the oil mist.

In addition, in the cooking appliance according to the present disclosure, the air flowing inside the door can be discharged through the first outlet to cool an entire front surface of the display unit. In addition, the air flowing inside the door can cool the heat-generating parts mounted on the rear surface of the display unit and inside the door.

The objects of the present disclosure are not limited to the above-described objects, and other objects and advantages not mentioned may be understood by the following description, and will be more clearly understood by the embodiments of the present disclosure. In addition, it will be easily seen that the objects and advantages of the present disclosure may be realized by the means described in the claims and combinations thereof.

BRIEF DESCRIPTION OF THE DRAWINGS

The accompanying drawings constitute a part of this specification and illustrate one or more embodiments of the present disclosure and together with the specification, explain the present disclosure.

DETAILED DESCRIPTION OF EXEMPLARY EMBODIMENTS

Figure 1:
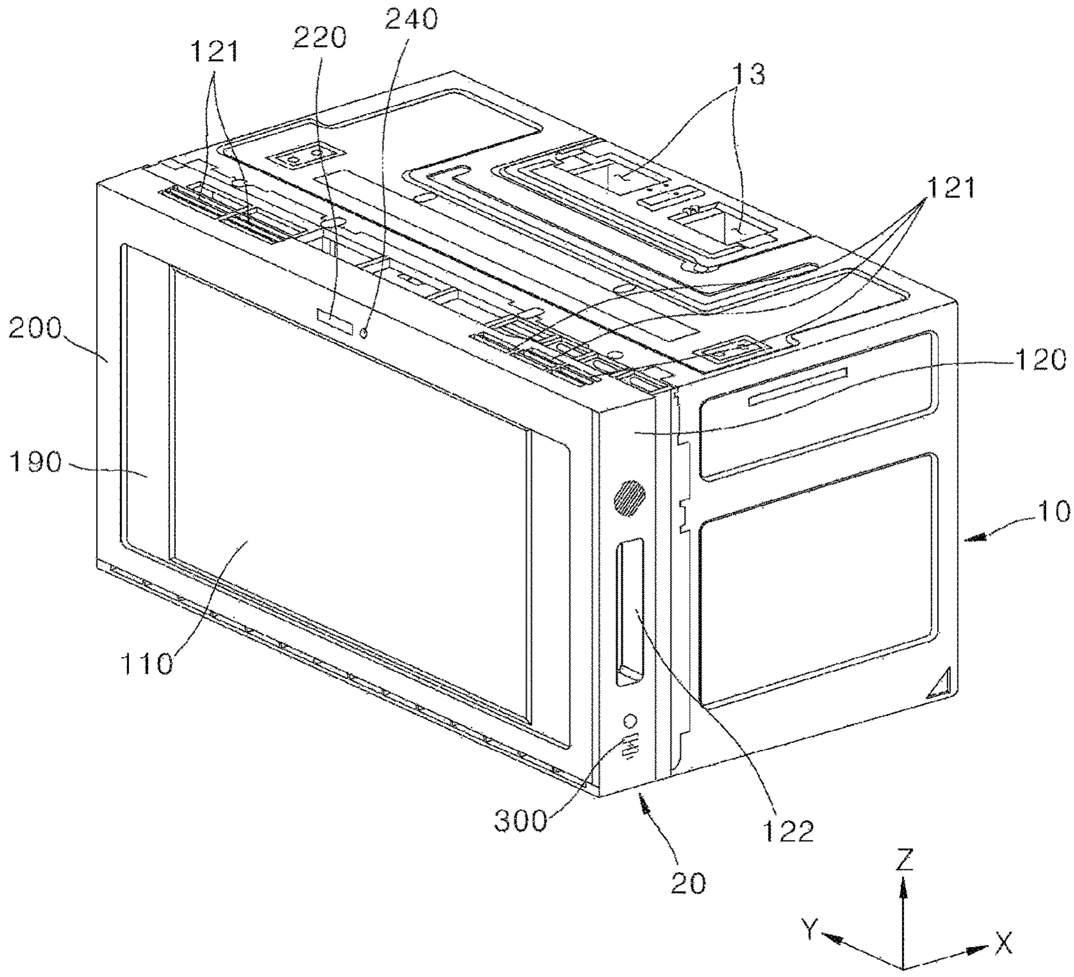
FIG. 1 is a perspective view illustrating a cooking appliance according to an embodiment of the present disclosure.

The above-described objects, features, and advantages will be described below in detail with reference to the accompanying drawings, and accordingly, those skilled in the art to which the present disclosure pertains will be able to easily practice the technical spirit of the present disclosure. In describing the present disclosure, when it is determined that a detailed description of a known technique related to the present invention may unnecessarily obscure the gist of the present disclosure, the detailed description will be omitted. Hereinafter, embodiments according to the present disclosure will be described in detail with reference to the accompanying drawings. In the drawings, the same reference numerals are used to indicate the same or similar components.

Although the first, second, etc. are used to describe various components, it is understood that these components are not limited by these terms. These terms are only used to distinguish one component from other components, and unless otherwise stated, it is understood that the first component may also be the second component.

As used herein, unless specifically stated otherwise, each component may be singular or plural.

As used herein, the singular expression includes the plural expression unless the context clearly dictates otherwise. In the present disclosure, terms such as "consisting of" or "comprising" should not be construed as necessarily including all of the various components or various steps described in the specification, and should be construed that some components or some steps may not be included, or additional components or steps may be further included.

As used herein, various singular forms "a," "an" and "the" are intended to include various plural forms as well, unless context clearly indicates otherwise. For example, a term "a" or "an" shall mean "one or more," even though a phrase "one or more" is also used herein. Use of the optional plural "(s)," "(es)," or "(ies)" means that one or more of the indicated feature is present.

As used herein, when "A and/or B" is used, it means A, B or A and B, unless specifically stated otherwise, and when "C to D" is used, it means greater than or equal to C and smaller than or equal to D unless specifically stated otherwise.

As used herein, "up-down direction" means the up-down direction of the cooking appliance in a state in which the cooking appliance (or other components) is installed for daily use. “Left-right direction” means a direction perpendicular to the up-down direction, and the front-rear direction means a direction perpendicular to both the up-down direction and the left-right direction. “Bilateral direction” or “lateral direction” has the same meaning as the left-right direction, and these terms may be used interchangeably in the present specification.

Various terminology used herein can imply direct or indirect, full or partial, temporary or permanent, action or inaction. For example, when an element is referred to as being “on,” “connected” or “coupled” to another element, then the element can be directly on, connected or coupled to the other element or intervening elements can be present, including indirect or direct variants. In contrast, when an element is referred to as being “directly connected” or “directly coupled” to another element, there are no intervening elements present.

Figure 2:
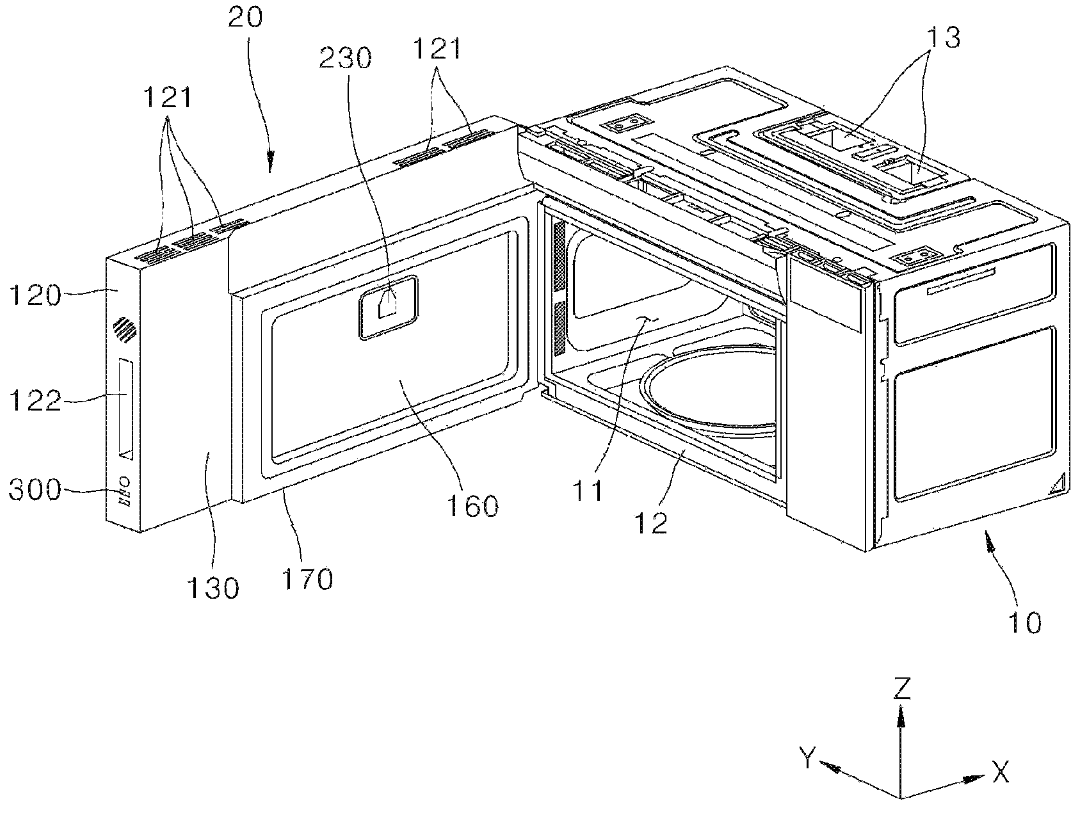
FIG. 2 is a view illustrating a state in which a door in FIG. 1 has been opened.

FIG. 1 is a perspective view illustrating a cooking appliance according to one embodiment of the present disclosure. FIG. 2 is a view showing a state in which a door 20 of FIG. 1 is in an open state.

The cooking appliance according to the embodiment may be disposed at a location spaced apart from a heating cooking device in an up-down direction above a location where the heating cooking device, for example, a heating-type oven, a gas range, etc. is disposed.

The placement of the cooking appliance allows a user to conveniently use cooking devices including the cooking appliance. In addition, the cooking appliance may function as a hood of the heating cooking device disposed thereunder. In this case, the cooking appliance may be provided with components for use as a hood.

The cooking appliance may cook food using microwaves, and/or heater heat, which are type(s) of electromagnetic waves. The cooking appliance may include a main body 10 in which a cavity 11 is formed, and a door 20 that opens and closes to provide access to the cavity 11.

Food to be cooked may be placed inside the cavity 11. The door 20 may be disposed in front of the cavity 11 and rotatably mounted on the main body 10 to open and close the cavity 11.

A vent hole 13 for discharging the air sucked in a suction unit provided on a lower portion of the main body 10 to the outside may be provided in an upper portion of the main body 10. The suction unit may be provided at a lower portion of the main body 10 of the cooking appliance. Accordingly, the cooking appliance may serve as a hood for suctioning the air discharged from the heating cooking device disposed thereunder to discharge the air to the outside.

The main body 10 may further include a front panel 12 provided on an edge of the entrance of the cavity 11, and having one surface disposed to face one surface of a choke member 170 when the door 20 is closed to close the cavity 11.

The front panel 12 may be provided to surround an edge of the entrance of the cavity 11 and protrude with a predetermined width. Accordingly, when the door 20 is closed, the edge portion of the door 20 and the cavity 11 may overlap each other.

This structure can allow the front panel 12 to seal the cavity 11 in a state in which the door 20 is closed, thereby suppressing the oil, moisture, oil mist, etc. generated in the process of cooking food placed in the cavity 11 from being discharged to the outside through an inlet of the cavity 11.

Figure 3A:
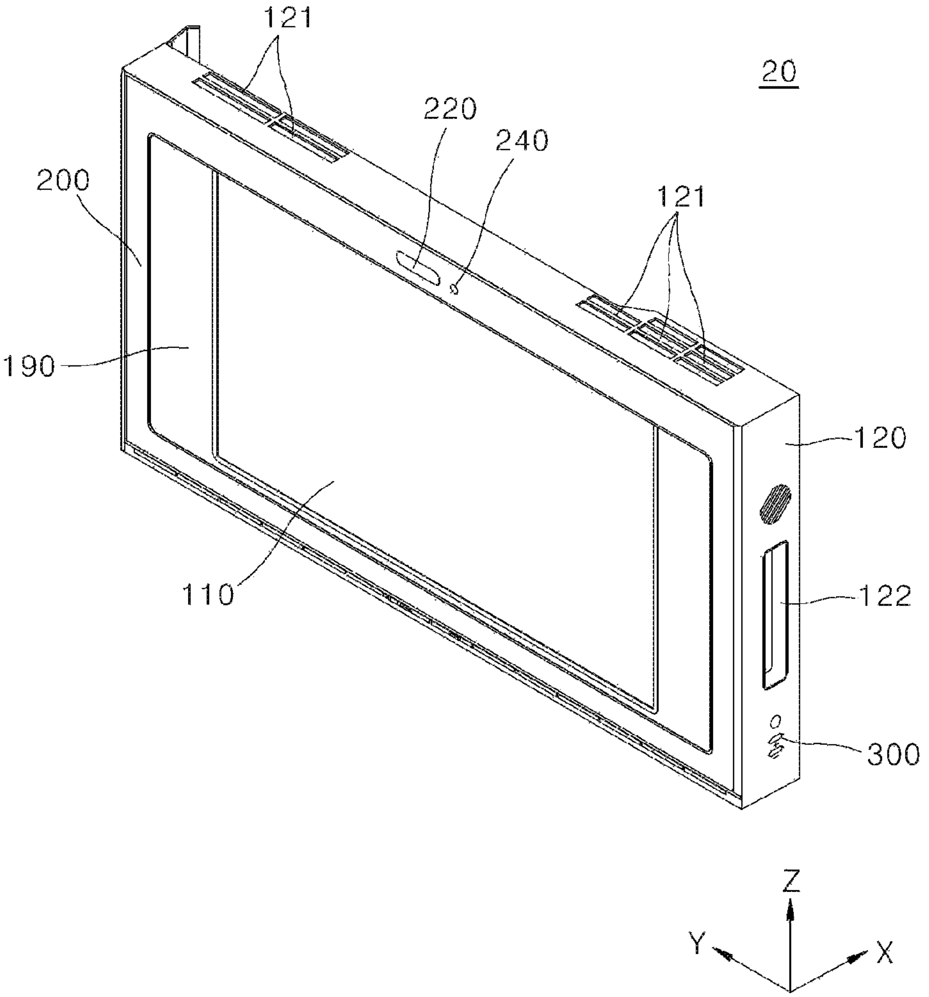
FIG. 3A is a perspective view illustrating a door of the cooking appliance according to an embodiment of the present disclosure.
Figure 3B:
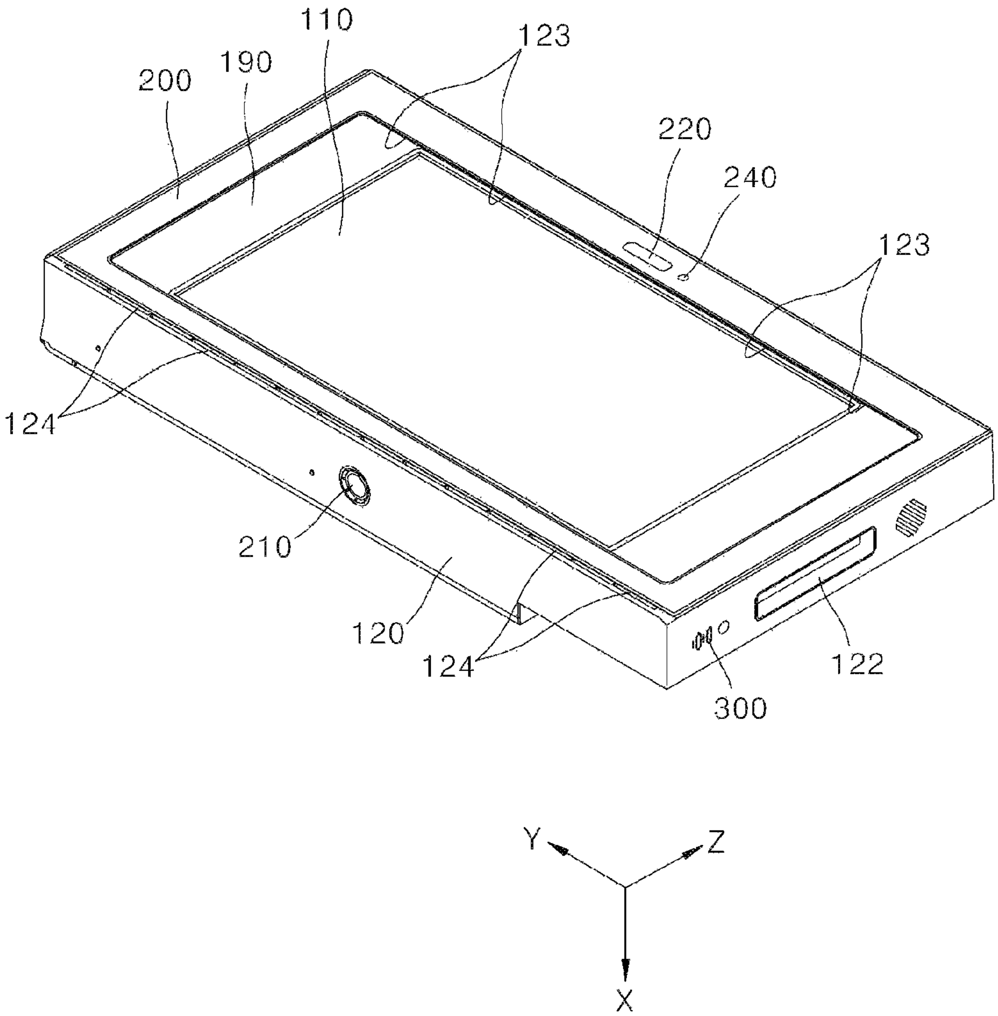
FIG. 3B is a view of FIG. 3A from another direction.
Figure 4A:
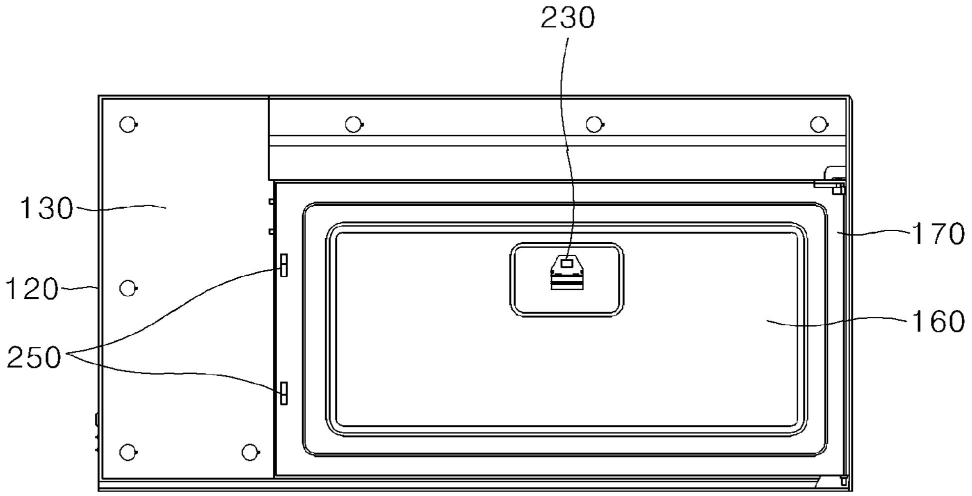
FIG. 4A is a rear view of the door.
Figure 4B:
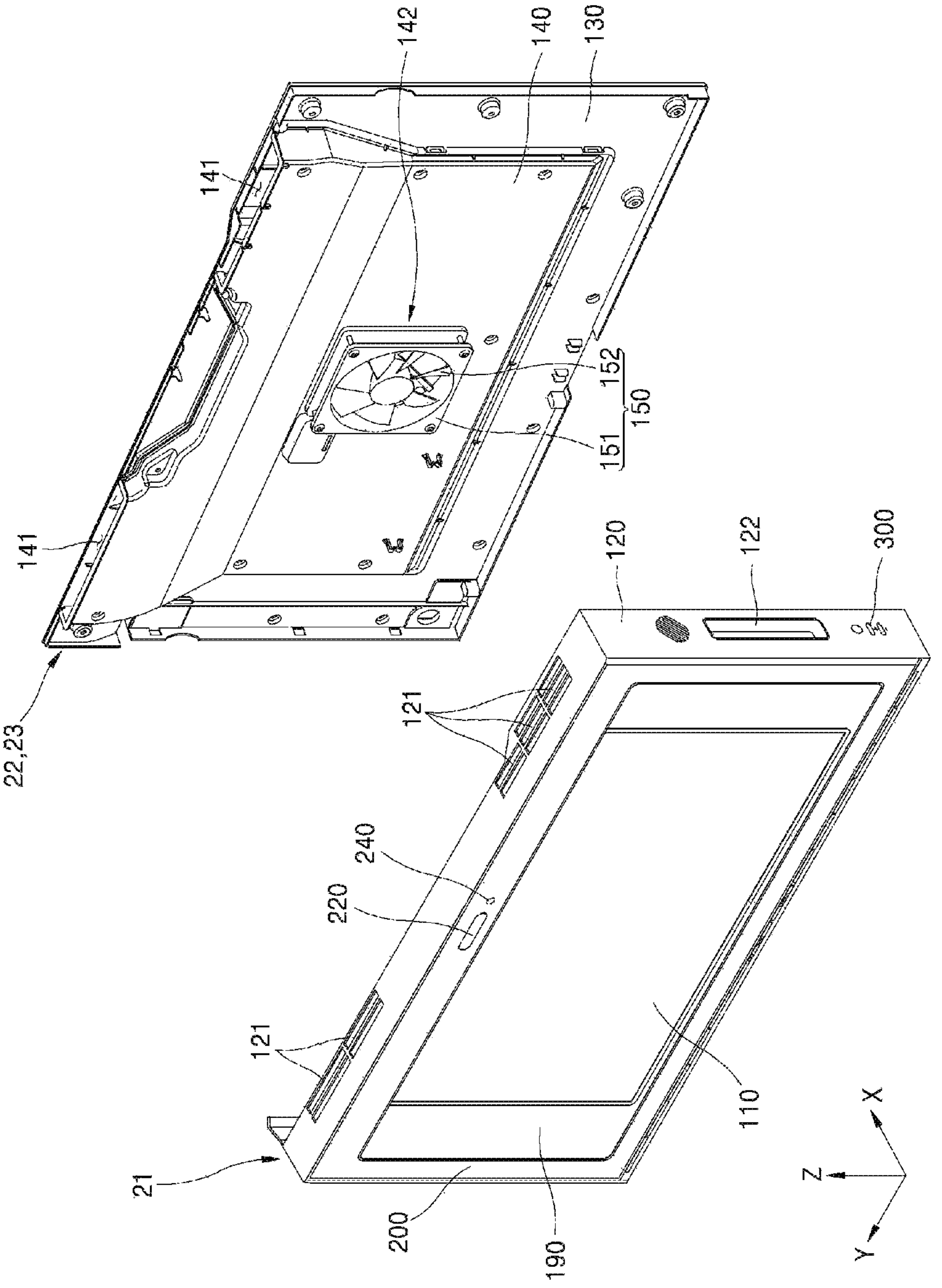
FIG. 4B is an exploded perspective view illustrating a part of the door according to an embodiment of the present disclosure.
Figure 4C:
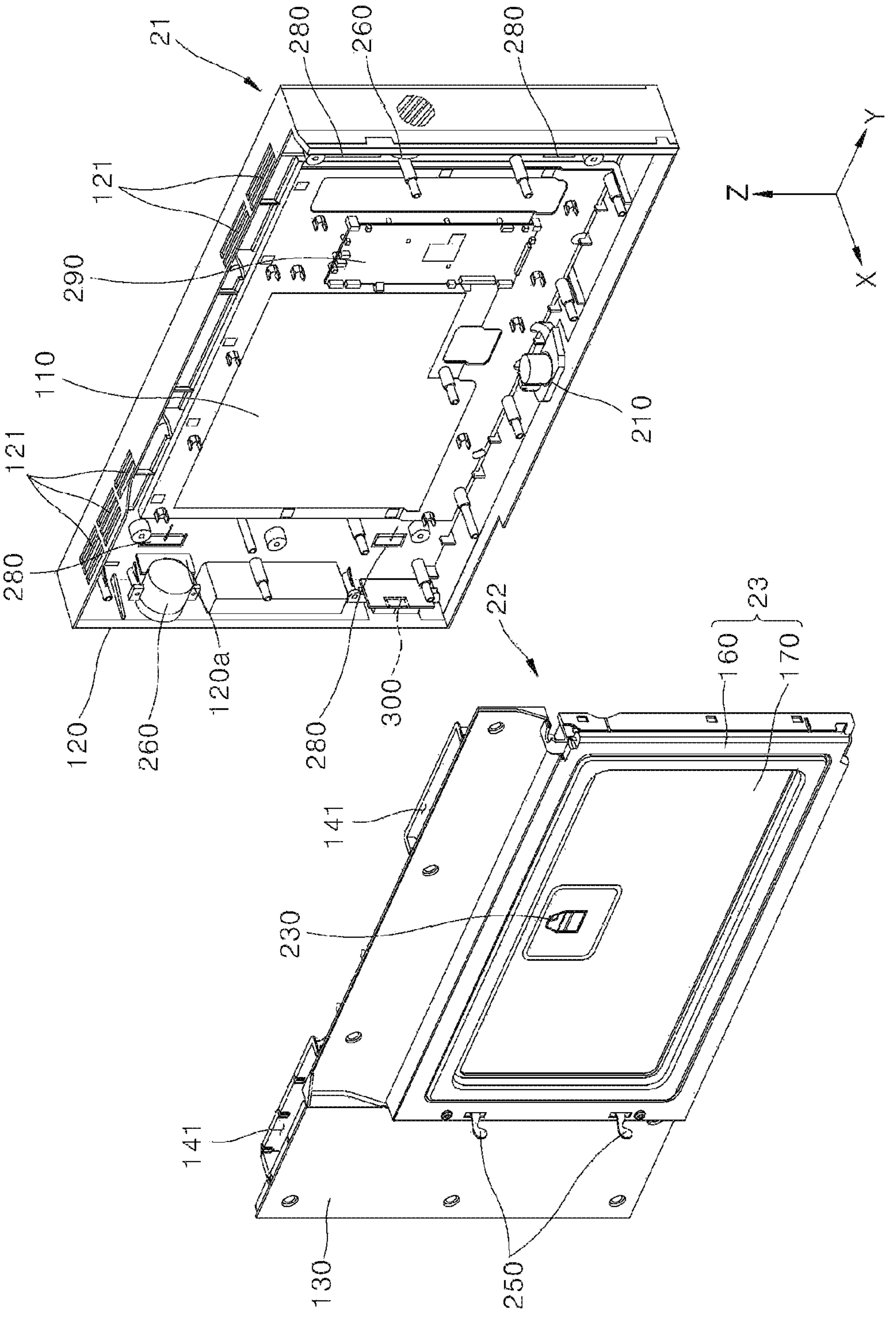
FIG. 4C is a view of FIG. 4B from another direction.

FIG. 3A is a perspective view illustrating the door 20 of the cooking appliance according to one embodiment of the present disclosure. FIG. 3B is a view of FIG. 3A from another direction. FIG. 4A is a rear view of the door 20. FIG. 4B is an exploded perspective view showing a part of the door 20 according to one embodiment. FIG. 4C is a view of FIG. 4B from another direction.

The door 20 may include a display module 21, a cooling flow path unit 22, and a shielding unit 23. The display module 21 may be disposed in front of the door 20. The user may see the inside of the cavity 11 of the cooking appliance through the display module 21.

The cooling flow path unit 22 may be disposed behind the display module 21, and a flow path through which air for cooling flows may be formed therein. The air flowing into the door 20 may flow into the door 20 through the cooling flow path unit 22 to cool the door 20.

The shielding unit 23 may be disposed behind the cooling flow path unit 22, and may shield electromagnetic waves generated from the main body 10. The shielding unit 23 may protect the user by blocking the electromagnetic waves generated in the cavity 11 and propagating to the outside of the cooking appliance. The shielding unit 23 may be disposed behind the display module 21.

For example, the shielding unit 23 may serve to block the electromagnetic waves (microwaves) generated to cook food in the main body 10 from being discharged to the outside of the door 20.

The cooling flow path unit 22 may be provided to cool electronic components mounted inside the door 20, including a display unit 110 mounted on the display module 21. The air for cooling the door 20 may flow inside the cooling flow path unit 22. The display unit 110 may be formed in a thin shape and provided so that an area of the display unit 110 occupies most of one surface of the door 20.

Accordingly, the display unit 110 may be formed to occupy a substantial portion of the front portion of the door 20, and the placement area of the display unit 110 can be increased, thereby improving user visibility. A display unit 110 having a large screen allows the user to more conveniently check various types of information.

Since the size of the display unit 110 is increased, the amount of heat generated may increase. Accordingly, the display unit 110 in the door 20 must be effectively cooled. In the embodiment, the cooling flow path unit 22 through which the cooling air flows may be separately provided.

The cooling flow path unit 22 may be disposed behind the display unit 110 so that cooling air flows, and thus the display unit 110 may be effectively cooled by the air flowing through the cooling flow path unit 22. In addition, a heat-generating part mounted on the display module 21 may be cooled by the air flowing through the cooling flow path unit 22. In other words, the cooling flow path unit 22 may cool the display module 21 provided with the display unit 110 and other heat-generating parts.

In order to effectively cool the display unit 110, the entire display unit 110 may be provided to be exposed to the air flowing through the cooling flow path unit 22. In addition, the airflow discharged to the outside of the door 20 through the cooling flow path unit 22 may form an air curtain to block heat and oil mist rising from the heating cooking device disposed below the cooking appliance.

To this end, the air flowing through the cooling flow path unit 22 may be branched inside the cooling flow path unit 22 and discharged to the top and bottom of the display module 21.

The cooling air is branched inside the cooling flow path unit 22 and discharged to the top and bottom of the display module 21, so that the cooling air can flow while in contact with the entire rear surface of the display unit 110 to effectively cool the display unit 110.

In addition, the cooling air is discharged to each of the top and bottom of the display module 21 to effectively form the air curtain around the display and the door 20, so that the heat and oil mist rising from the heating cooking device disposed below the cooking appliance can be blocked by the air curtain.

The display module 21 may be provided with the display unit 110, a camera, and other electronic parts, and the cooling flow path unit 22 may be provided with electronic parts such as a blowing device 150 operated by a motor. Accordingly, the shielding unit 23 configured to shield the electromagnetic waves generated from the main body may be provided behind the cooling flow path unit 22 in order to protect the user and the electronic parts from electromagnetic waves.

The display unit 110 and various electronic parts may be disposed in the display module 21, the cooling flow path unit 22 in which the flow path of the air for cooling the display module 21 is formed may be disposed behind the display module 21, and the shielding unit 23 configured to shield electromagnetic waves from contacting the electronic parts provided in the display module 21 may be disposed behind the cooling flow path unit 22.

In the embodiment, the display module 21 configured to provide various types of information and convenience to the user may be disposed on the front surface of the cooking appliance, e.g., on the front of the door 20. In addition, in the embodiment, there is a need for a structure that cools the parts such as the display unit 110 provided in the display module 21, cools the inside of the door 20 provided with the display unit 110 and the like, and at the same time, forms the flow path of the cooling air for forming the air curtain around the door 20, and also protects the electronic parts mounted on the door 20 from electromagnetic waves.

To satisfy one or more of the above needs, the display module 21 may be disposed at the front of the door 20, the cooling flow path unit 22 may be disposed behind the display module 21, and the shielding unit 23 may be disposed behind the cooling flow path unit 22.

In other words, the display module 21, the cooling flow path unit 22, and the shielding unit 23 may be sequentially disposed on the door 20 from the front to rear in the door 20.

In addition, the display module 21, the cooling flow path unit 22, and the shielding unit 23 may be provided to be coupled to each other to prevent the cooling air from flowing out to the outside of the door 20 through other portions other than a first outlet 123 disposed at an upper portion of the display module 21 and a second outlet 124 at a lower portion of the display module 21. Hereinafter, the door 20 implemented using the above-described structure will be described in more detail.

The display module 21 may include the first outlet 123 and the second outlet 124. The first outlet 123 may be disposed at the upper portion of the display module 21, and the air flowing inside the display module 21 may be discharged to the outside through the first outlet 123.

The second outlet 124 may be disposed at the lower portion of the display module 21, and the air flowing inside the display module 21 may be discharged to the outside through the second outlet 124. In other words, the air flowing inside the door 20 may be discharged to the outside through the first outlet 123 and the second outlet 124 respectively disposed at the upper and lower portions of the door 20, so that the air can flow through all or substantially all of the inside of the door 20 to cool the entire door 20.

The display module 21 may include the display unit 110 and an outer panel 120. The display unit 110 may be disposed on the front surface of the door 20 to display videos or images.

The display unit 110 may display information related to the cooking operation to provide the information to the user. In addition, the display unit 110 may receive a user's command in a touch recognition method.

Meanwhile, the display unit 110 may be connected to communicate with other appliances, cameras, locks, etc. provided in the front door. In addition, the display unit 110 may be connected to communicate with an external device required by the user.

The user may receive information necessary for operations of home appliances, visits by outsiders, and other aspects of daily life from the display unit 110, and transmit commands to home appliances and other devices connected to the display unit 110 using the display unit 110.

Accordingly, the door 20 including the display unit 110 may serve as a kind of Internet of Things (IoT) hub that transmits information about home appliances and other devices necessary for daily life to the user, and transmits the user's commands to these devices.

The outer panel 120 may be disposed behind the display unit 110, and the display unit 110 may be mounted thereon. The outer panel 120 may have a hollow 1201 and may be provided in a shape having a predetermined width in the front-rear direction of the door 20.

The hollow 1201 of the outer panel 120 may be closed by the rear surface of the display unit 110. The air flowing inside the outer panel 120 may collide with the rear surface of the display unit 110 exposed to the hollow 1201 of the outer panel 120. Accordingly, the air flowing inside the outer panel 120 may come into contact with the rear surface of the display unit 110 to cool the display unit 110.

In addition, the air passing through a blowing fan 152 may be exposed to the hollow 1201 of the outer panel 120 to cool heat-generating parts such as, for example, a speaker 260, a microphone 270, a communication unit 280, and a control board 290 to be disposed.

Since the outer panel 120 has the above-described structure, the outer panel 120 may have an interior space, and various parts may be built in in the interior space. A width in the front-rear direction of the door 20 may be substantially determined by the outer panel 120.

A first aperture 121 into which air flows may be formed in an upper end of the outer panel 120. A plurality of first apertures 121 may be provided. Each of the first apertures 121 may be provided so that a plurality of slit-shaped holes are arranged at intervals. This structure can suppress or prevent foreign substances from flowing into the door 20 through the first aperture 121.

A handle 122 may be provided at one side of the outer panel 120 for a user to open and close the door 20. The handle 122 may be formed, for example, by recessing a side portion of the outer panel 120.

A button device 300 may be mounted on one side of the outer panel 120, for example, below a location where the handle 122 is formed. The user may supply power to the cooking appliance or cut off the power supply by manipulating the button device 300. Specific manipulation for the operation of the cooking appliance is possible by inputting commands into the display unit 110.

The outer panel 120 may support various components such as the display unit 110, the speaker 260, the microphone 270, the communication unit 280, and the control board 290. The outer panel 120 may be formed with the first aperture 121 into which external air flows, and the first outlet 123 and the second outlet 124 through which air is discharged.

The door 20 may be provided with a camera. The camera may capture at least one place among the front or the lower portion of the door 20, or the cavity 11.

The images captured by the camera may be transmitted to and reproduced on the display unit 110, and the user may view images inside the cavity 11 or of the lower portion of the cooking appliance through the display unit 110. The camera may include any number of cameras, including a first camera 210, a second camera 220, and a third camera 230.

The first camera 210 may be mounted on a lower portion of the outer panel 120 to capture a state of the lower portion of the door 20. The first camera 210 may be mounted on a lower portion of the display module 21. Since the first camera 210 is mounted on the lower portion of the outer panel 120 so that a gaze direction faces the lower portion of the cooking appliance, the first camera 210 may also capture the heating cooking device disposed below the cooking appliance.

The user may observe the state of the heating cooking device and the state of food being cooked on the heating cooking device by the image captured by the first camera 210 and reproduced on the display unit 110.

The second camera 220 may be disposed on the upper portion of the door 20 and may capture the front of the door 20. The second camera 220 may also capture the front of the cooking appliance.

The second camera 220 may be provided to pass through a baffle 190 and a front cover 200, which will be described in more detail below. The user may observe the situation in front of the cooking appliance captured and recorded by the second camera 220.

The second camera 220 may also capture the user positioned in front of the cooking appliance. Accordingly, the second camera 220 may be used for the user to make a video call with other people in a remote location outside the front door using the display unit 110.

The third camera 230 may be mounted on a frame 160 to be described in more detail below, may be disposed to face the cavity 11, and may capture the cavity 11. In other words, the gaze of the third camera 230 may be provided to face the cavity 11 to capture the situation inside of the cavity 11. The user may observe a situation in which food is being cooked in the cavity 11 through the image(s) captured by the third camera 230.

The door 20 may include a human detection unit 240 configured to detect the presence of the user in front of the cooking appliance. The human detection unit 240 may be disposed on the upper portion of the door 20, mounted by passing through the baffle 190 and the front cover 200, disposed at a location spaced apart from the second camera 220.

The human detection unit 240 may detect whether there is a person in front of the door 20 by, for example, infrared recognition or gesture recognition. A control unit provided in the cooking appliance may identify whether there is a user in front of the cooking appliance through the human detection unit 240.

When there is a user in front of the cooking appliance, for example, the control unit may operate the display unit 110 to activate the functions of the cooking appliance necessary for the user's convenience and safety by taking an action to enable the user to use the display unit 110.

Referring to FIG. 4A, a hinge device 162 may be provided on one side of the frame 160. The hinge device 162 of the frame 160 may be coupled to the main body 10 of the cooking appliance. The frame 160 is hinge-rotated with respect to the main body 10 by the hinge device 162, and accordingly, the door 20 may open and close to provide access to the cavity 11 of the main body 10.

The door 20 may include a latch 250 mounted on the side of the frame 160, which has a part formed to protrude from the frame 160. The latch 250 may be formed in a structure that is caught or latched in a groove formed in the front panel 12 of the door 20. The latch 250 may maintain the closed state of the door 20.

Figure 5:
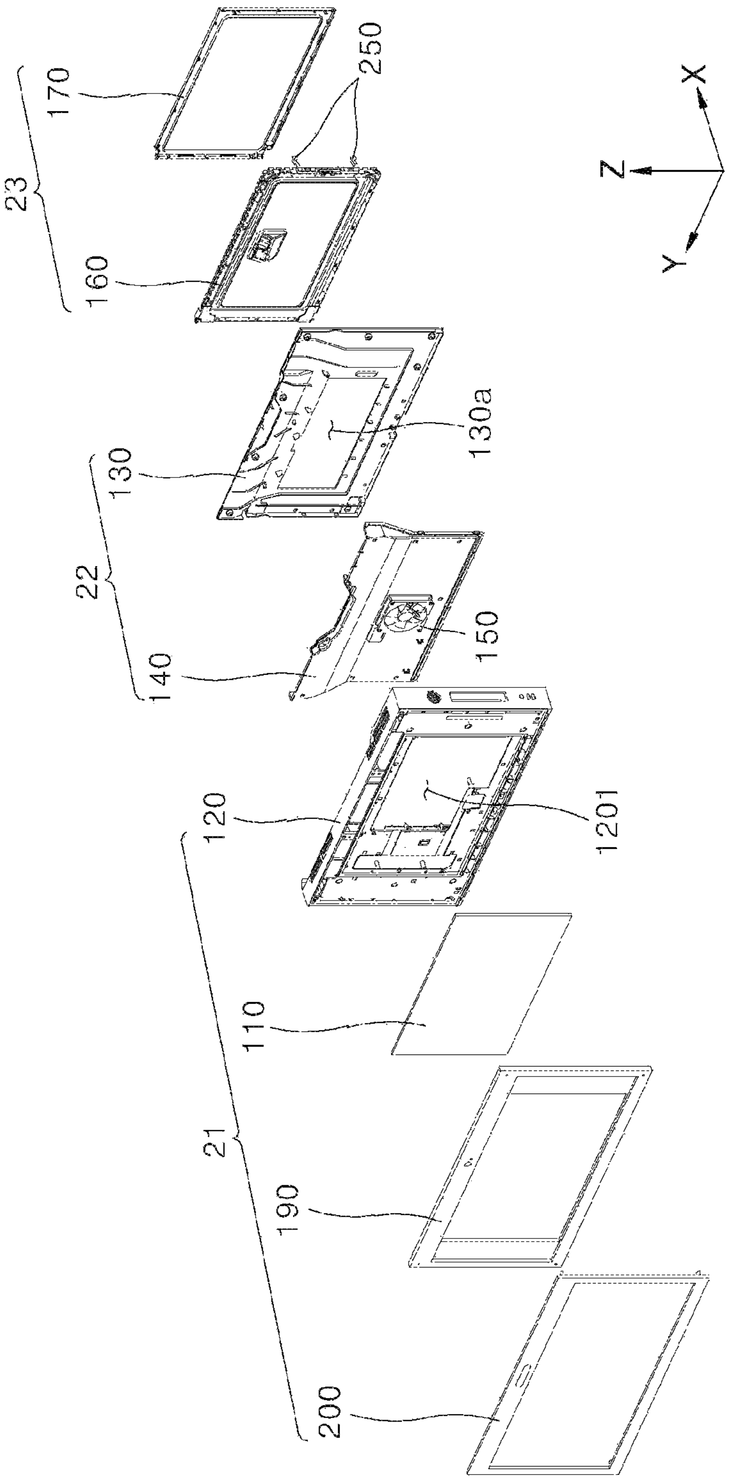
FIG. 5 is an exploded perspective view of the door according to an embodiment of the present disclosure.
Figure 6:
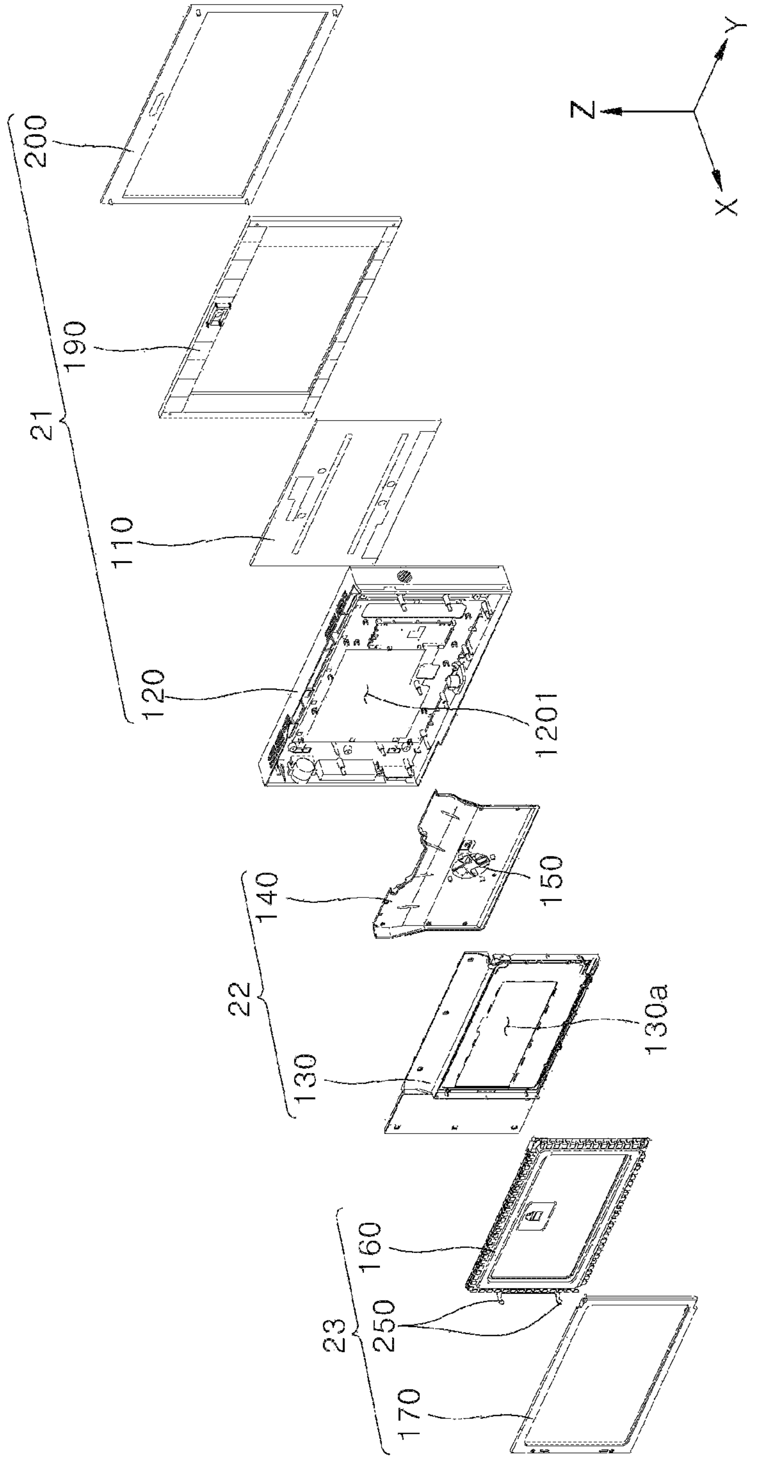
FIG. 6 is a view of FIG. 5 from another direction.

FIG. 5 is an exploded perspective view of the door 20 according to one embodiment of the present disclosure. FIG. 6 is a view of FIG. 5 from another direction.

The cooling flow path unit 22 may include an inner panel 130, an air guide 140, and/or a blowing device 150.

The inner panel 130 may be disposed behind the outer panel 120 and mounted on the outer panel 120. The air guide 140 to be described below may be mounted on the inner panel 130. The inner panel 130 along with the air guide 140 may form a space in which the air suctioned into the door 20 flows. The inner panel 130 may be mounted with the air guide 140 and coupled to the frame 160 to provide the space in which the air flowing into the door 20 flows.

The air guide 140 may be disposed between the outer panel 120 and the inner panel 130, and coupled to the inner panel 130. The air guide 140 may guide the flow of air flowing into the door 20 from the outside, and form the space in which the air may flow.

The blowing device 150 may be mounted on the air guide 140. The blowing device 150 may forcibly flow the air flowing into the air guide 140 from the rear to the front of the air guide 140.

The door 20 may further include the frame 160, the choke member 170, the baffle 190, and the front cover 200.

The frame 160 may be disposed behind the inner panel 130. The frame 160 may be coupled to the inner panel 130, and may have one side rotatably coupled to the main body 10. Accordingly, as the frame 160 rotates, the door 20 may be rotated to open and close the cavity 11 of the cooking appliance.

The frame 160 may be coupled to the inner panel 130 to form a flow path of air for cooling. The frame 160 may also form an inner surface of the door 20 with a shielding structure for preventing the leakage of electromagnetic waves, that is, the choke member 170.

The choke member 170 may be disposed behind the frame 160, may be coupled to the frame 160, and may block the electromagnetic waves generated from the main body 10 from being discharged to the outside. The choke member 170 may be generally provided in a quadrangular shape having a hollow, and provided to surround an edge portion of the frame 160. It is understood that the choke member 170 is not limited to any particular shape.

The display module 21 may further include the baffle 190 and the front cover 200. The baffle 190 may be disposed in front of the display unit 110, may surround the edge of the display unit 110, and may be coupled to the outer panel 120 to mount the display unit 110 on the outer panel 120.

The baffle 190 is generally formed in a quadrangular shape having a hollow to surround the edge of the display unit 110, and thus may serve as a bezel of the display unit 110. It is understood that the baffle 190 is not limited to any particular shape.

The front cover 200 may be disposed in front of the baffle 190, and provided to surround the edge of the baffle 190. The front cover 200 may be generally formed in a quadrangular shape having a hollow, and may serve to stably couple the display unit 110 and the baffle 190 to the outer panel 120. It is understood that the front cover 200 is not limited to any particular shape.

Figure 7:
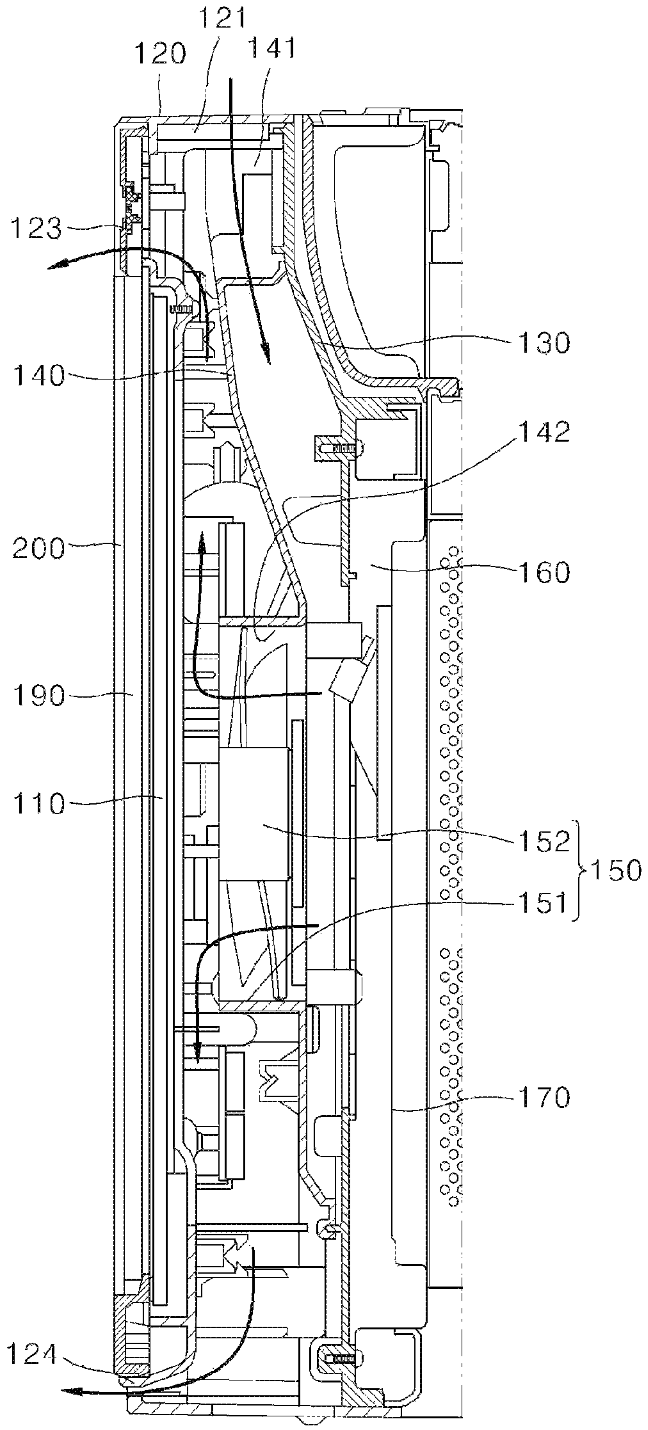
FIG. 7 is a side cross-sectional view of the door according to an embodiment of the present disclosure.
Figure 8:
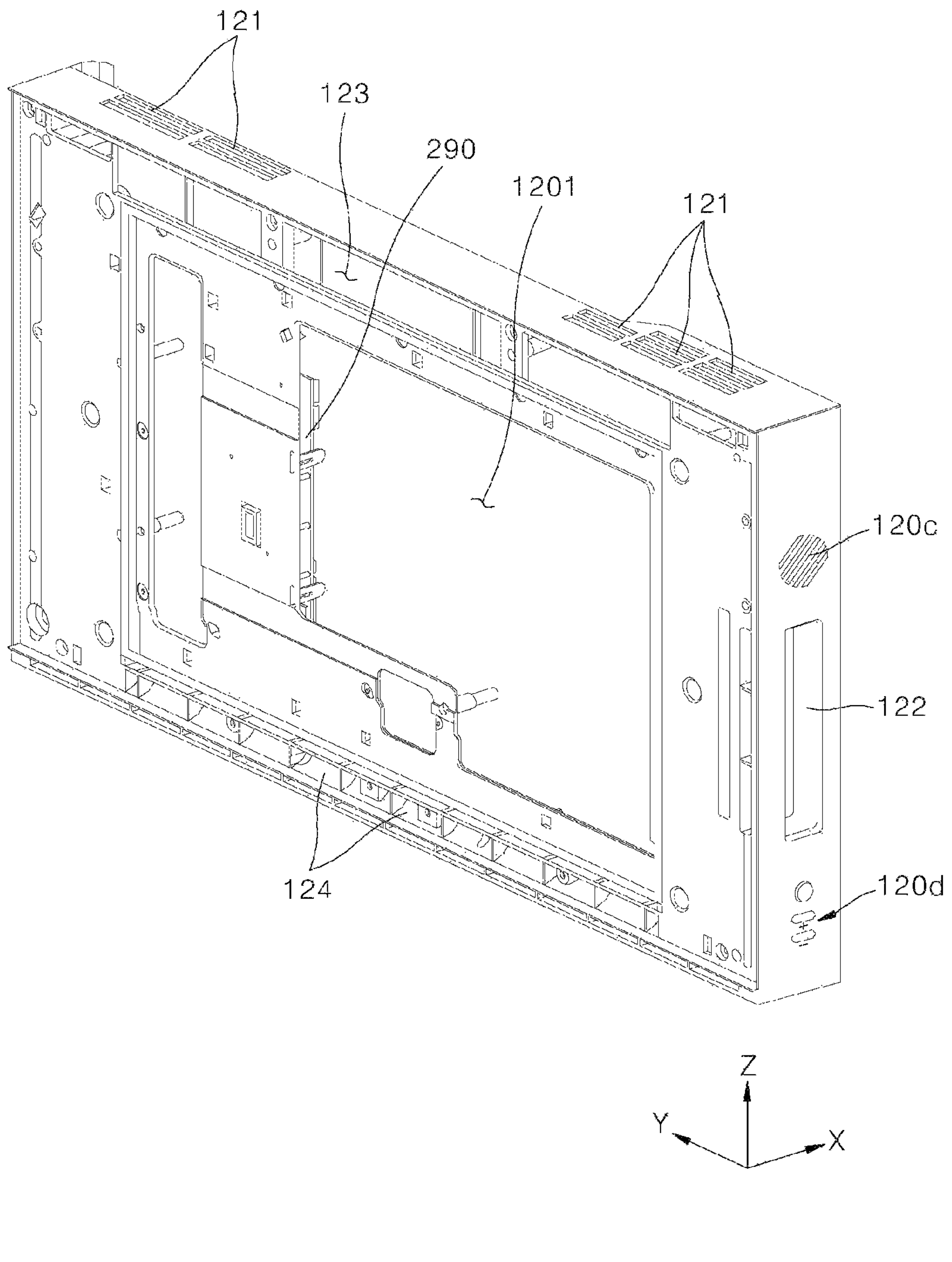
FIG. 8 is a perspective view illustrating an outer panel according to an embodiment of the present disclosure.
Figure 9A:
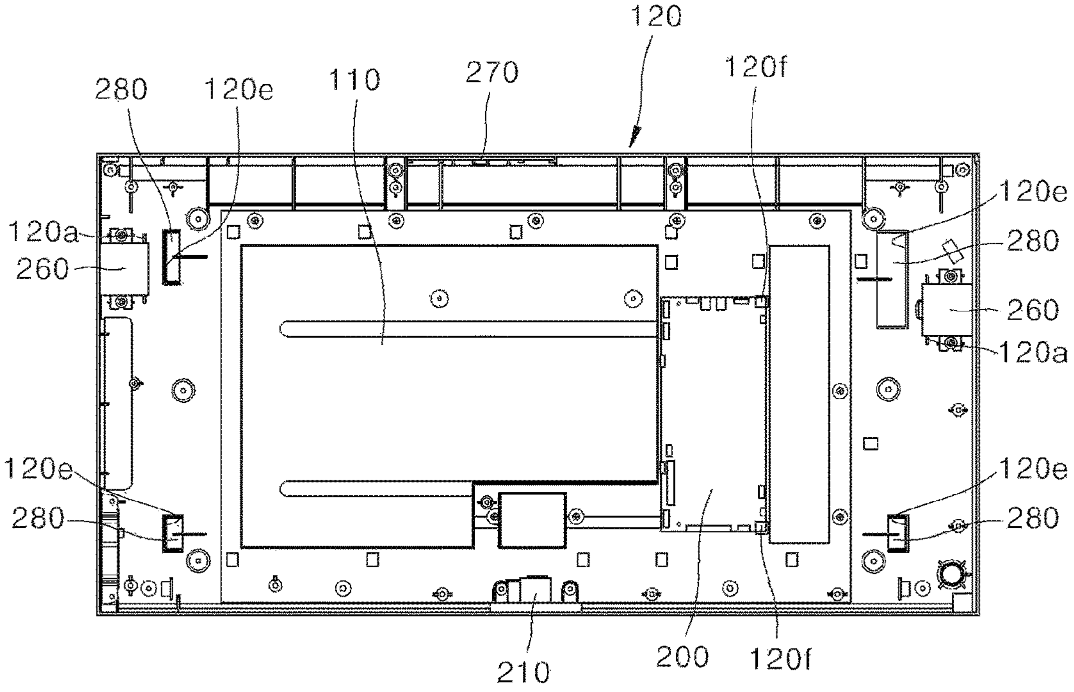
FIG. 9A is a rear view illustrating the outer panel according to an embodiment of the present disclosure.
Figure 9B:
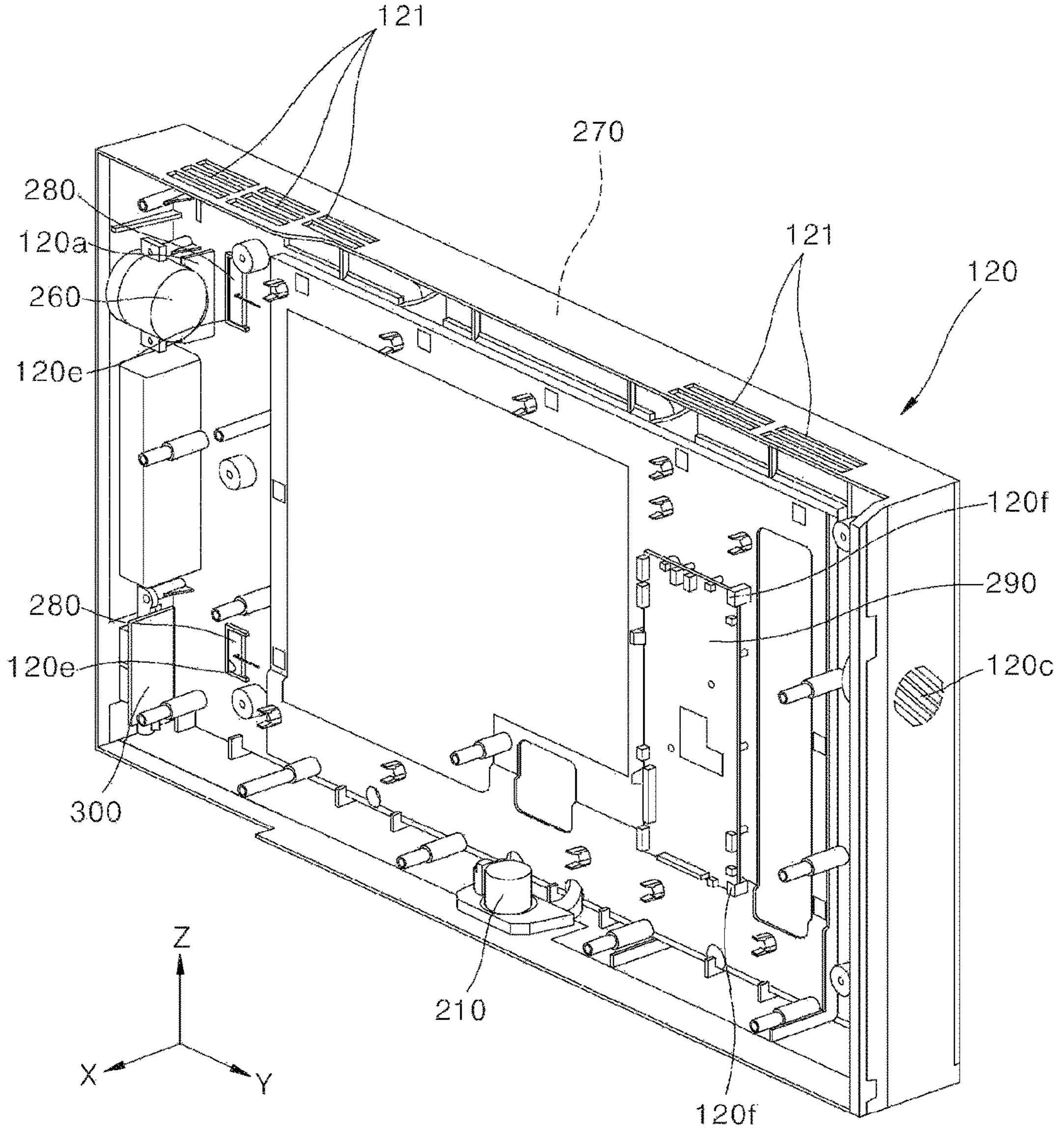
FIG. 9B is a view of FIG. 8 from another direction.
Figure 10:
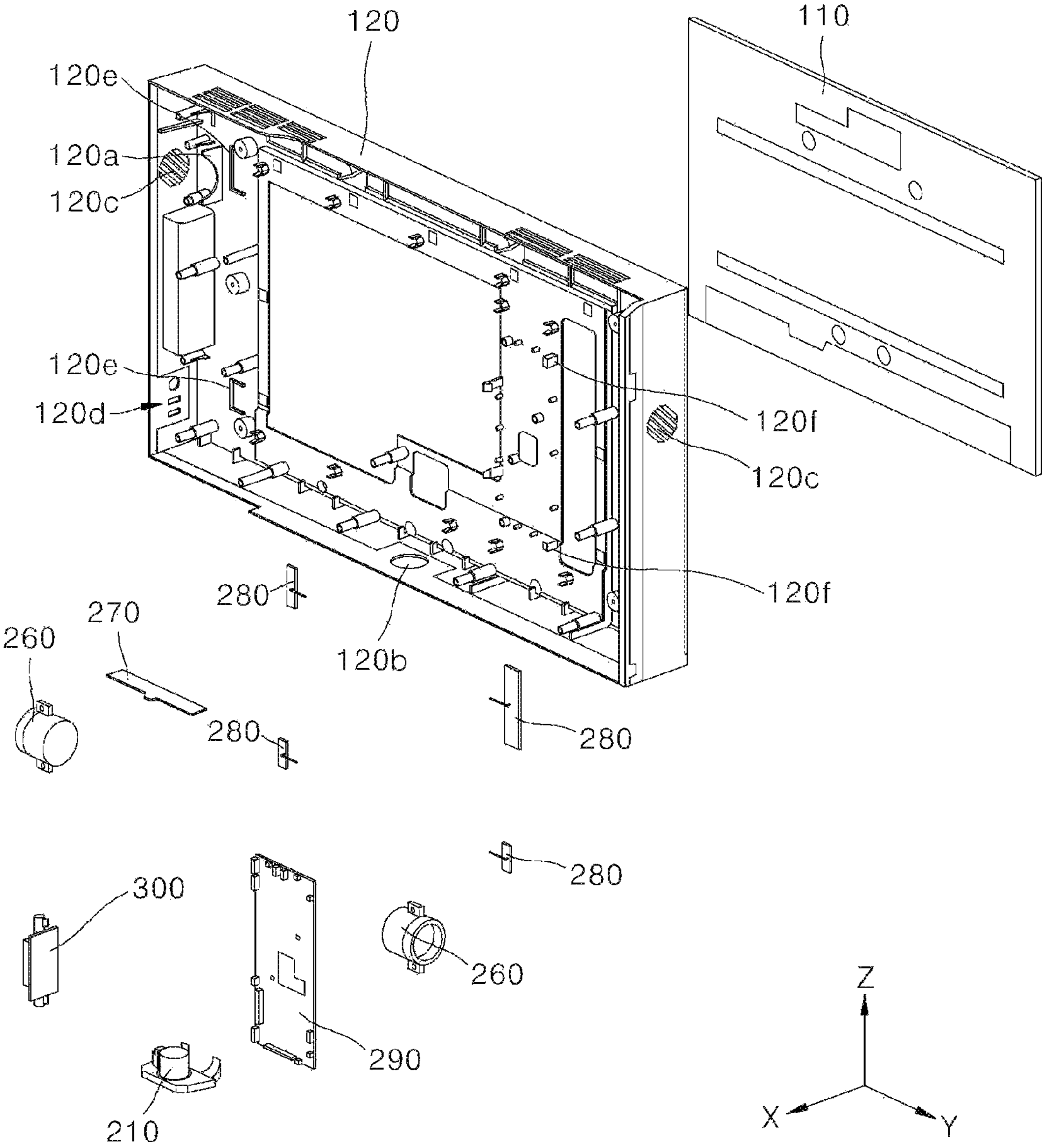
FIG. 10 is an exploded perspective view of a display unit and the outer panel.
Figure 11:
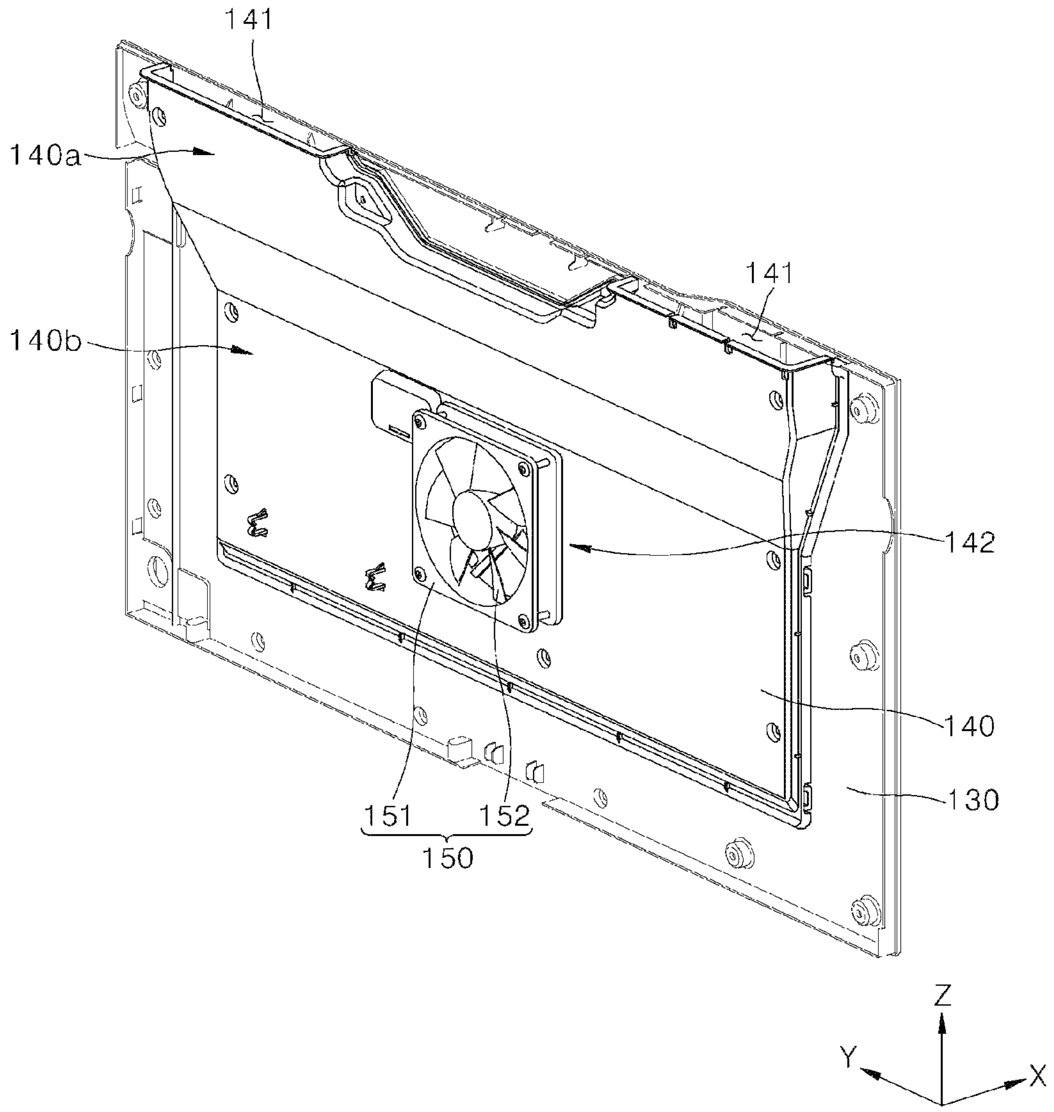
FIG. 11 is a view illustrating an inner panel and an air guide according to an embodiment of the present disclosure.

FIG. 7 is a side cross-sectional view of the door 20 according to one embodiment of the present disclosure. FIG. 8 is a perspective view showing the outer panel 120. FIG. 9A is a rear view showing the outer panel 120. FIG. 9B is a view of FIG. 8 from another direction. FIG. 10 is an exploded perspective view of the display unit 110 and the outer panel 120. FIG. 11 is a view showing the inner panel 130 and the air guide 140 according to one embodiment.

Referring to FIG. 10, the outer panel 120 may include components such as speaker 260, microphone 270, and communication unit 280. At least one speaker 260 may be mounted on the side of the outer panel 120. The speaker 260 may generate a voice, an alarm sound, etc. related to operations of the cooking appliance. In addition, the speaker 260 may generate voices, alarm sounds, etc. for the door 20 including the display unit 110 of the door 20 to serve as an Internet of Things (IoT) hub.

The microphone 270 may be mounted at the top of the outer panel 120 and may receive the user's voice. The user may input voice commands to operate the cooking appliance through the microphone 270. In addition, the microphone 270 may function for the door 20 to serve as an Internet of Things hub.

The communication unit 280 may be mounted on the outer panel 120 at a location spaced apart from the speaker 260 and the microphone 270. Since the door 20 may serve as an Internet of Things hub, the communication unit 280 provided in the door 20 may be appropriately provided to perform various types of wired or wireless communication functions to communicate with the Internet.

Accordingly, a plurality of communication units 280 may be provided, and each communication unit 280 may be provided as a device corresponding to a different communication method.

For example, the communication unit 280 may be provided as a wireless communication device, and each communication unit 280 may be provided as any one of a ZigBee communication device, a Wi-Fi communication device, a jet wave communication device, and a Bluetooth communication device. However, the communication method of the communication unit 280 is not limited thereto, and the communication unit 280 may also be provided as a wired communication device.

Meanwhile, the control board 290 for controlling the cooking appliance may be mounted on the outer panel 120. A control unit configured to control the cooking appliance may be implemented on the control board 290.

The outer panel 120 may be provided with a holder 120*a*, an opening hole 120*b*, a first through hole 120*c*, a second through hole 120*d*, a mounting guide 120*e*, and a fitting projection 120*f*.

The holder 120*a* may be provided to support the speaker 260. The holder 120*a* may be formed to protrude from an inner wall of the outer panel 120, a part of which may have an arc shape to correspond to a circular shape of the speaker 260.

The speaker 260 may be mounted on the holder 120*a* and provided on the outer panel 120. Since a pair of speakers 260 are provided, a pair of holders 120*a* may also be provided and formed at a location corresponding to each of the pair of speakers 260.

The opening hole 120*b* may be formed to pass through the bottom of the outer panel 120. The first camera 210 may be disposed at a location adjacent to the opening hole 120*b* to be able to view the lower side of the outer panel 120 through the opening hole 120*b*.

The first through hole 120*c* may be formed in the side of the outer panel 120. The first through hole 120*c* may be provided adjacent to a location where the speaker 260 is disposed. The first through hole 120*c* may allow the speaker 260 to communicate with the outside and at the same time, may be formed in a mesh shape in order to suppress the speaker 260 from being exposed to the outside.

The speaker 260 may communicate with the outside of the outer panel 120 through the first through hole 120*c* to effectively transmit an alarm and other voices to the user. Since a pair of speakers 260 are provided, a pair of first through holes 120*c* may also be provided and formed at a location corresponding to each of the pair of speakers 260.

The second through hole 120*d* may be formed in a lower portion of one side of the outer panel 120 to pass through the outer panel 120. A part of the button device 300 mounted inside the outer panel 120 through the second through hole 120*d* may be exposed to the outside of the outer panel 120. The user may manipulate the button device 300 by contacting the exposed portion of the outer panel 120.

The mounting guide 120*e* may be formed on the inner wall of the outer panel 120 to support the plurality of communication units 280. Accordingly, the mounting guide 120*e* may be provided in the same number as the plurality of communication units 280. The mounting guide 120*e* may guide the communication unit 280 to be mounted on the outer panel 120.

For example, the mounting guide 120*e* may be provided so that a projection having a shape corresponding to the edge of the communication unit 280 is formed on the inner wall of the outer panel 120. Each of the plurality of mounting guides 120*e* may be provided to have a shape and size corresponding to the shape and size of each of the plurality of communication units 280.

The fitting projection 120*f* may be formed to protrude from the inner wall of the outer panel 120. A plurality of fitting projections 120*f* may be provided and disposed to be spaced apart from each other. The control board 290 may be fitted onto the fitting projections 120*f*. For example, the fitting projection 120*f* may be disposed at a location adjacent to the edge of the plate-shaped control board 290.

Accordingly, the control board 290 may have corners fitted onto the fitting projections 120*f* and may be mounted on the outer panel 120. A shape fitting structure corresponding to the shape of the control board 290 may be formed on the fitting projection 120*f* so that the corner of the control board 290 is fitted.

As shown in FIG. 8, the first outlet 123 may be disposed on the upper portion of the outer panel 120, and the second outlet 124 may be disposed on the lower portion of the outer panel 120.

The first outlet 123 may be disposed on the upper portion of the outer panel 120, and the air flowing by the blowing device 150 may be discharged to the outside. The second outlet 124 may be disposed on the lower portion of the outer panel 120, and the air flowing by the blowing device 150 may be discharged to the outside.

Meanwhile, referring to FIG. 3B, when the door 20 is assembled, the first outlet 123 and the second outlet 124 may be partially blocked by the baffle 190 and the front cover 200. Holes for discharging air may thus be formed at locations corresponding to the first outlet 123 and the second outlet 124 in the baffle 190.

The first outlet 123 may be provided at a location adjacent to an upper end of the display unit 110, and the second outlet 124 may be provided at a location adjacent to a lower end of the display unit 110. Accordingly, the air forcibly flowing inside the door 20 by the blowing device 150 may be discharged to the outside at locations adjacent to the upper and lower ends of the display unit 110 through the first outlet 123 and the second outlet 124.

The air discharged through the first outlet 123 may form an air curtain on the upper portion of the door 20. In addition, the air discharged through the second outlet 124 may form an air curtain on the lower portion of the door 20.

The air curtain blocks the permeation of an external airflow into the door 20. In the embodiment, a boundary surface or a boundary zone in which the flow of air discharged from the inside of the door 20 through the first outlet 123 and the second outlet 124 forms a boundary against the flow of the external air may be referred to as an air curtain.

The air curtain formed by the air discharged from the inside of the door 20 through the first outlet 123 and the second outlet 124 may suppress the permeation of external air into the door 20.

Since the heating cooking device is disposed below the cooking appliance, the heat generated when the heating cooking device is used and the oil mist generated from the food being cooked may rise and permeate into the cooking appliance.

The heat transmitted from the heating cooking device to the cooking appliance may damage parts of the door 20 provided in the cooking appliance. In particular, parts in which the display unit 110 and circuits, elements, etc. related to its operation are embedded may be vulnerable to heat.

In addition, the oil mist transmitted from the food being cooked may be attached to the door 20 provided in the cooking appliance. The oil mist may be attached to the surface of the display unit 110 to lower the image quality of the display unit 110, and attached to the surfaces of other parts mounted on the door 20 to damage these parts.

In the embodiment, the airflow discharged to the outside of the door 20 through the first outlet 123 and the second outlet 124 provided in the door 20 forms the air curtain, so that the heat and oil mist rising from the heating cooking device disposed below the cooking appliance can be effectively blocked by the air curtain.

Accordingly, it is possible to effectively suppress or prevent various electronic parts, including the display unit 110 provided in the door 20, from being damaged or degraded by the heat and the oil mist.

Referring to FIG. 11, the air guide 140 may include at least one inlet 141 and a mounting hole 142. The inlet 141 may be disposed on an upper portion of the air guide 140 and external air may be introduced through the inlet 141.

The inlet 141 may be disposed at a location corresponding to the first aperture 121 provided on the upper portion of the outer panel 120. Accordingly, the external air may pass through the first aperture 121 of the outer panel 120 to flow into the door 20 through the inlet 141.

The mounting hole 142 may be formed in a lower portion of the inlet 141 in the air guide 140 (below the inlet 141), and the blowing device 150 may be mounted therein. The mounting hole 142 may be formed to pass through the air guide 140 in the front-rear direction of the door 20.

Accordingly, air may flow from the upper portion to the lower portion of the air guide 140 through the inlet 141, and its direction may be changed, so that the air may flow from the rear to the front of the air guide 140 through the mounting hole 142.

The blowing device 150 may include a casing 151 and the blowing fan 152. The casing 151 may be disposed in the mounting hole 142 and formed with a hollow, and the blowing fan 152 may be mounted in the hollow.

The blowing fan 152 may be rotatably mounted in the casing 151, and may flow air from the rear to the front of the air guide 140. The blowing fan 152 may receive electricity and rotate to flow air inside the door 20.

By the rotation of the blowing fan 152, external air may flow into the door 20 through the inlet 141, and may be discharged to the outside of the door 20 through the first outlet 123 and the second outlet 124. The mounting hole 142 of the air guide 140 may be formed in the middle of the casing 151 and formed to correspond to the location, area, and shape of the hollow in which the blowing fan 152 is disposed.

Hereinafter, the airflow inside the door 20 will be described in more detail with reference to FIG. 7. In FIG. 7, the airflow is indicated by arrows.

As the blowing fan 152 rotates, external air may flow into the door 20 through the inlet 141 of the air guide 140, and flow to be discharged to the outside of the door 20 through the first outlet 123 and the second outlet 124.

The air forcibly flowing by the blowing fan 152 may specifically have the following flow path of the airflow:

The air may flow into the door 20 from the first aperture 121 of the outer panel 120 and the inlet 141 provided at a location corresponding thereto. The air flowing into the door 20 may flow downward from the door 20 to flow into the blowing fan 152.

The air may pass through the blowing fan 152 in the front-rear direction of the door 20. At this time, the air may pass through the mounting hole 142 of the air guide 140 while passing through the blowing fan 152. The flow direction of the air in the blowing fan 152 may be changed from the up-down direction of the door 20 to the front-rear direction thereof.

Since the front of the mounting hole 142 is blocked by the display unit 110, the air passing through the mounting hole 142 may be branched in the up-down direction in front of the air guide 140.

A part of the branched air may flow upward from the door 20 and may be discharged through the first outlet 123. The other part of the branched air may flow downward from the door 20 and may be discharged through the second outlet 124.

The air branched from the first outlet 123 and the second outlet 124 may surround the entire door 20. In particular, the branched air may surround the front surface of the door 20. This structure allows the air discharged from the first outlet 123 and the second outlet 124 to form an air curtain on the door 20, thereby suppressing or preventing the heat and oil mist generated from the heating cooking device disposed below the cooking appliance from permeating the door 20.

Meanwhile, at least a part of the air discharged from the first outlet 123 may contact the front surface of the display unit 110 while moving downward by gravity to cool the display unit 110.

In addition, the above-described airflow structure inside the door 20 allows the air flowing into the door 20 to flow through the entire inside of the door 20. For example, the air may flow in the entire space formed by the rear surface of the display unit 110 and the outer panel 120.

Accordingly, the air flowing inside the door 20 may cool the entire rear surface of the display unit 110, and thus cool the outer panel 120 and other parts mounted on other portions of the door 20.

In particular, the outer panel 120 may be provided with parts that generate heat, such as the speaker 260, the microphone 270, the communication unit 280, and the control board 290. These heat-generating parts may be disposed over the entire outer panel 120. Accordingly, the air may flow through the entire inside of the outer panel 120, thereby cooling these heat-generating parts.

As shown in FIG. 7, the first aperture 121 and the inlet 141 into which air flows may communicate with each other. As the blowing fan 152 rotates, the external air may flow into the air guide 140 through the first aperture 121 and the inlet 141 to flow toward the blowing device 150 through the space formed by the inner panel 130 and the air guide 140.

The air may flow toward the blowing fan 152 of the blowing device 150 in the space formed by the frame 160. The air may pass through the blowing fan 152 and collide with the rear surface of the display unit 110 disposed to face the blowing fan 152 to cool the display unit 110.

After the air passing through the blowing fan 152 collides with the rear surface of the display unit 110, the flow may be branched in the upward and downward direction of the display unit 110. The air directed to the upper side of the display unit 110 may be discharged to the outside of the door 20 through the first outlet 123 provided on the upper portion of the outer panel 120. The air flowing downward from the display unit 110 may be discharged to the outside of the door 20 through the second outlet 124 provided on the lower portion of the outer panel 120.

In the embodiment, the air flowing inside the door 20 can cool the entire front surface of the display unit 110 while being discharged through the first outlet 123. In addition, the air flowing inside the door 20 can effectively cool the heat-generating parts mounted on the rear surface of the display unit 110 and inside the door 20.

Figure 12:
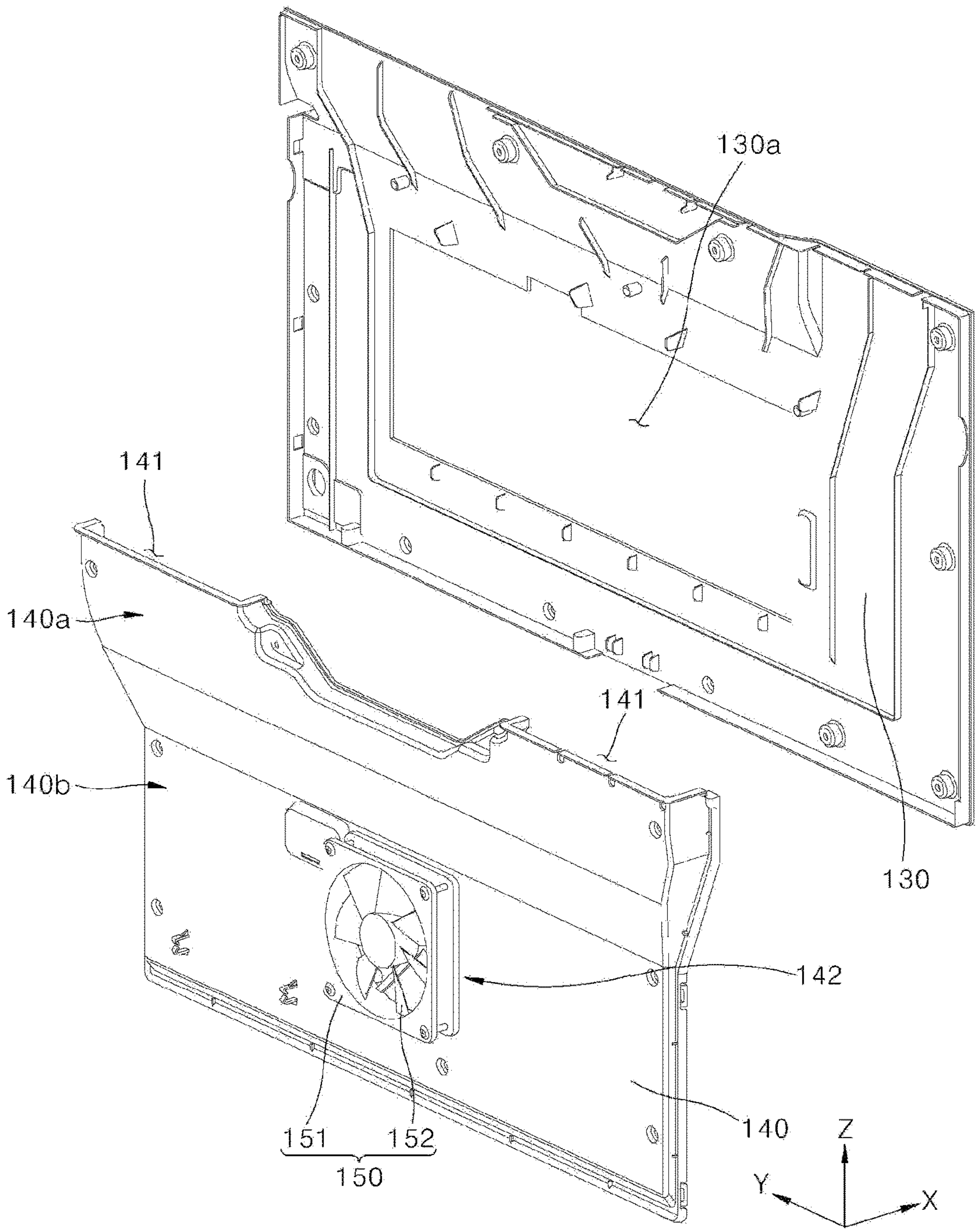
FIG. 12 is an exploded perspective view of FIG. 11.
Figure 13:
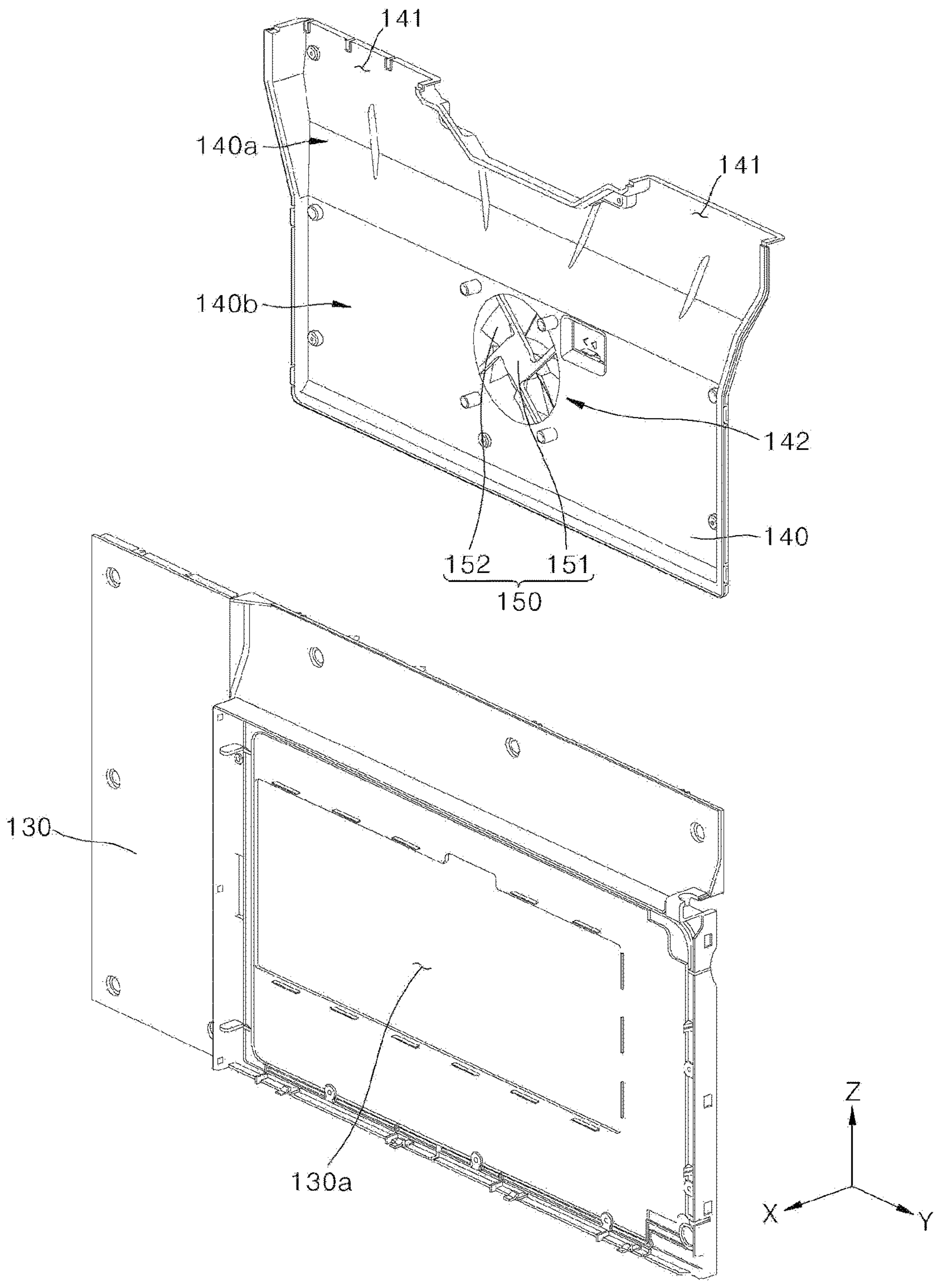
FIG. 13 is a view of FIG. 12 from another direction.

FIG. 12 is an exploded perspective view of FIG. 11. FIG. 13 is a view of FIG. 12 from another direction.

Referring to FIG. 13, the mounting hole 142 may be formed in the middle of the air guide 140. The casing 151 has a hollow having a location, size, and shape corresponding to the mounting hole 142, and the blowing fan 152 may be disposed in the hollow. The casing 151 may be disposed at a location corresponding to the hollow and the mounting hole 142 of the air guide 140 and mounted on one surface of the air guide 140.

A hollow **130*a* may be formed in the inner panel 130. Since the hollow 130*a* of the inner panel 130 is blocked by the frame 160, the air introduced through the inlet 141 may not leak into the hollow 130*a* of the inner panel 130. Accordingly, the inner panel 130 and the frame 160 together may form a flow path of the air through which the air cooling the inside of the door 20** flows.

The air guide 140 may include an upper portion **140*a* in which the inlet 141 is formed and a lower portion 140*b* in which the blowing device 150 is disposed. When the air guide 140 and the inner panel 130 are coupled, the lower portion 140*b* may be generally disposed at a location corresponding to the hollow 130*a* of the inner panel 130**.

When looking down at the air guide 140 from the upper portion of the door 20, a cross-sectional area of the upper portion **140*a* of the air guide 140 may be formed to be greater than a cross-sectional area of the lower portion 140*b*. As the cross-sectional area of the upper portion 140*a* is expanded, the cross-sectional area of the inlet 141 may also be expanded. Accordingly, in the air guide 140, as the inlet 141 through which air is introduced is expanded, external air may be introduced into the air guide 140**.

Meanwhile, the lower portion **140*b* of the air guide 140 has a smaller cross-sectional area than that of the upper portion 140*a*, but since the lower portion 140*b* of the air guide 140 corresponds to the hollow 130*a* of the inner panel 130, the airflow space in the portion corresponding to the lower portion 140*b* may be expanded toward the frame 160 by the hollow 130*a* of the inner panel 130. As a result, the lower portion 140*b* of the air guide 140 may also have a shape in which the airflow space is expanded by the hollow 130*a* of the inner panel 130**.

In other words, the lower portion **140*b* of the air guide 140 corresponding to the hollow 130*a* of the inner panel 130 is formed to have a smaller cross-sectional area than that of the upper portion 140*a* of the air guide 140, but the flow space of the lower portion 140*b* of the air guide 140 may be expanded to the frame 160 by the hollow 130*a* of the inner panel 130**.

Accordingly, the upper portion **140*a* and the lower portion 140*b* of the air guide 140 may have the shape of an expanded cross-sectional area due to the above-described structure. Accordingly, the airflow space formed by coupling the air guide 140 and the inner panel 130 in the structure in which the air guide 140 and the inner panel 130 are coupled may be sufficiently wide, and the air may be smoothly introduced from the outside and may also smoothly pass through the blowing device 150 mounted on the lower portion 140*b* of the inner panel 130**.

In addition, due to the decrease in the cross-sectional area of the lower portion **140*b* of the air guide 140, conversely, the space in which the air passing through the blowing device 150 is discharged from the lower portion 140*b* of the air guide 140 may be expanded. At this time, the air passing through the blowing device 150 may pass through the hollow 1201 of the outer panel 120 and contact the display unit 110 to cool the display unit 110**.

The above-described structure allows the door 20 to have a relatively slim overall structure and increase the flow rate of air flowing therein, thereby improving the cooling efficiency of the door 20.

Figure 14A:
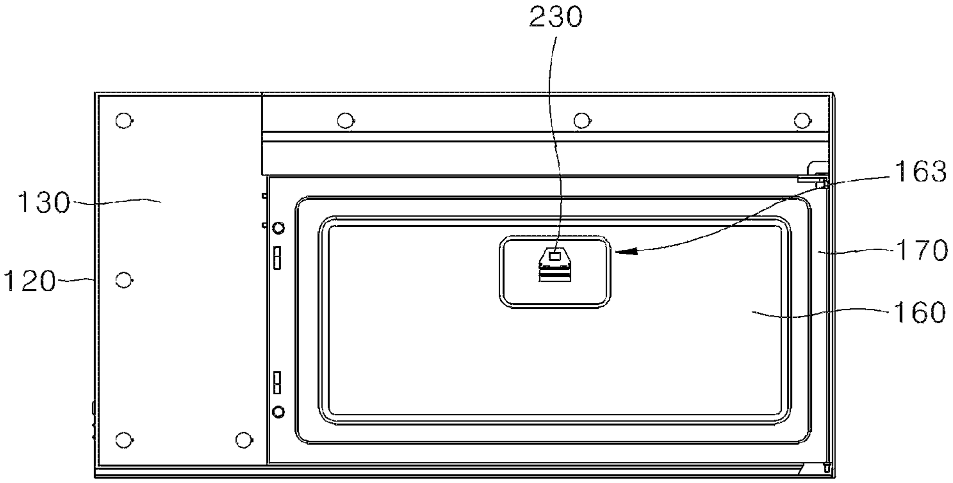
FIG. 14A is a rear view of the door according to an embodiment of the present disclosure.
Figure 14B:
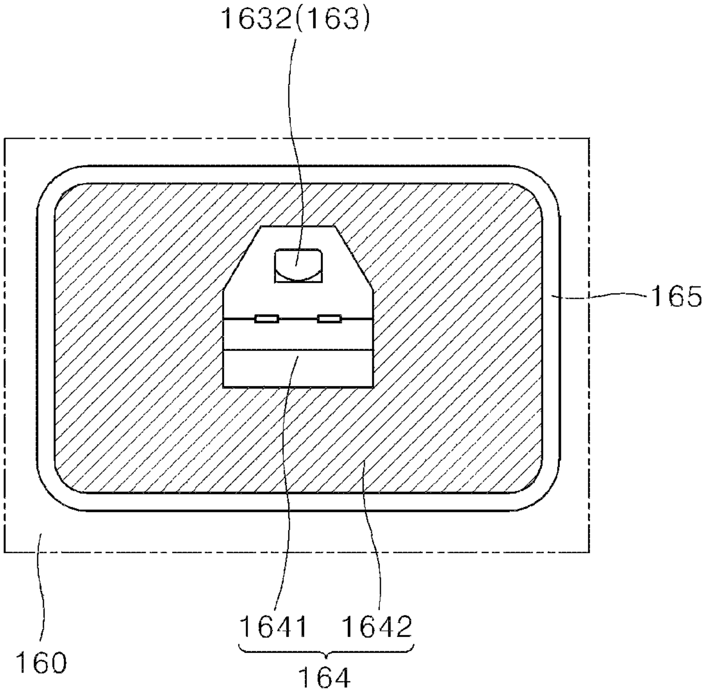
FIG. 14B is an enlarged view of a part of FIG. 14A.
Figure 15:
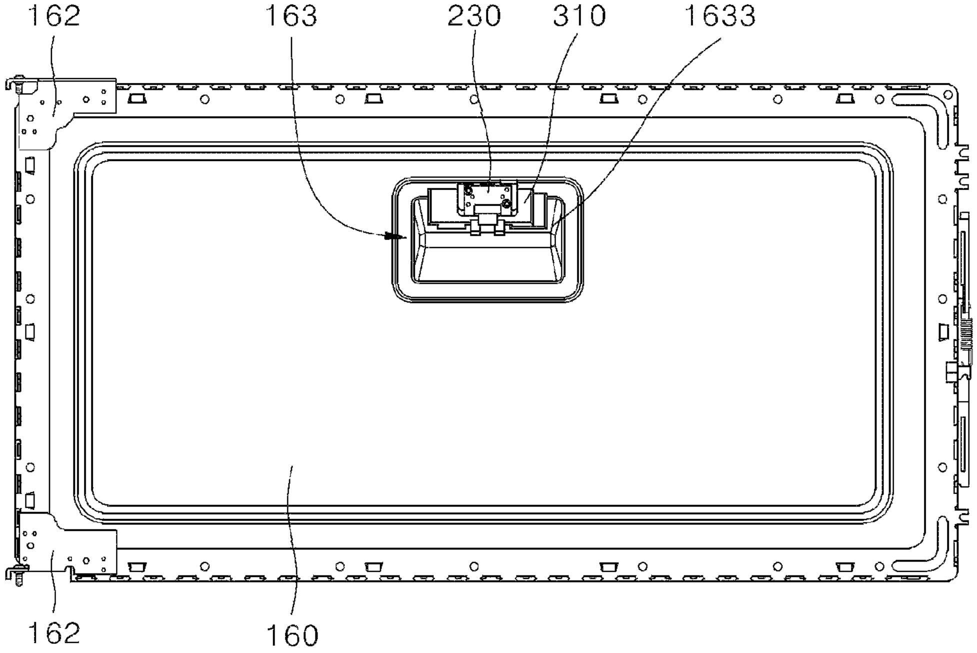
FIG. 15 is a front view of a frame in a state in which a third camera is mounted.

FIG. 14A is a rear view of the door 20 according to one embodiment of the present disclosure. FIG. 14B is an enlarged view of a part of FIG. 14A. FIG. 15 is a front view of the frame 160 in the state in which the third camera 230 is mounted.

The door 20 may be detachably mounted on the frame 160 and may include a supporter 310 on which the third camera 230 is mounted. The supporter 310 may be mounted on the frame 160. The supporter 310 may allow the third camera 230 to be mounted at a specific location of the frame 160.

The frame 160 may include a bracket 163, a window 164, and a sealing member 165. The bracket 163 may be formed at a location spaced upward from the center of the frame 160. Assuming that a line dividing the frame 160 in the up-down direction is the center of the frame 160, the bracket 163 may be provided at the location spaced upward from the center of the frame 160, such as shown.

The bracket 163 may have an opening 1631 opened in a direction toward the cavity 11 when the door 20 is closed. The bracket 163 may have a three-dimensional shape to adjust the gaze direction of the third camera 230. In other words, the bracket 163 may be formed by recessing one side surface of the frame 160 when viewing the bracket 163 from the cavity 11.

The window 164 may be disposed behind the bracket 163, that is, at a location facing the cavity 11 when viewed from the bracket 163, and mounted in the opening 1631 of the bracket 163.

Hereinafter, when the door 20 is closed, the rear or rear surface may refer to a location, a surface, or a direction that views the cavity 11 when viewed from the door 20.

The window 164 can close the opening 1631 of the bracket 163 to block the inflow of heat and oil mist transferred from the cavity 11 into the bracket 163, thereby protecting the third camera 230 mounted on the bracket 163.

The window 164 may be made of a transparent material so that the third camera 230 may capture the inside of the cavity 11 through the window 164. In addition, the window 164 may be made of a material having high heat resistance, such as a quartz material. However, the present invention is not limited thereto.

The sealing member 165 may be provided to seal a gap between the opening 1631 and the window 164. The sealing member 165 may be provided to surround the window 164 at an edge of the opening 1631, and attached to the bracket 163 and/or the window 164.

Accordingly, the sealing member 165 may be provided in a closed curved shape having a predetermined width. The sealing member 165 may be made of, for example, a silicone resin material having high heat resistance. However, the present invention is not limited thereto.

Referring to FIG. 14B, the window 164 may include a capturing region 1641 and a masking region 1642. The capturing region 1641 may be formed in a central portion of the window 164 and provided to be transparent. The gaze of the third camera 230 mounted on the bracket 163 may pass through the capturing region 1641 to capture the cavity 11 of the main body 10, which is a space in which food is placed and cooked.

The masking region 1642 may be provided to surround the capturing region 1641, and provided to be opaque. The masking region 1642 may be formed at an edge of the window 164. The masking region 1642 may be formed, for example, by applying an opaque ink or attaching an opaque film to the window 164.

The masking region 1642 may mask the gaze of the third camera 230. The third camera 230 may be masked by the masking region 1642 to capture the inside of the cavity 11, and an unnecessary portion may be covered by the masking region 1642.

Accordingly, the capturing region 1641 and a capturing range of the third camera 230 may be adjusted by the masking region 1642. An area of the masking region 1642 may be selected in consideration of the characteristics of the third camera 230, the size of the cavity 11, etc.

Meanwhile, by forming the masking region 1642 using a material having an electromagnetic wave blocking effect, the masking region 1642 may also function to block electromagnetic waves generated in the cavity 11 from propagating to the outside of the cooking appliance.

In this case, in particular, the electromagnetic waves can propagate to the third camera 230 through the window 164, thereby preventing the image quality of the third camera 230 from being lowered by noise generated by the electromagnetic waves.

Figure 16:
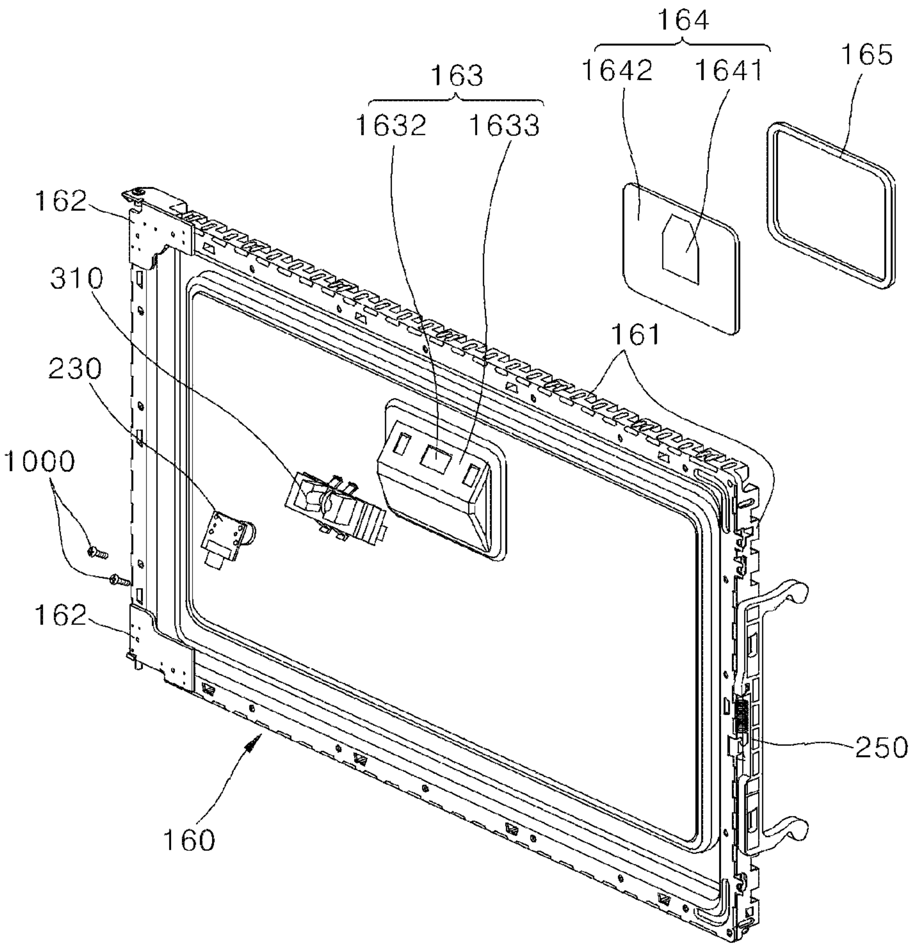
FIG. 16 is an exploded perspective view of FIG. 15.
Figure 17:
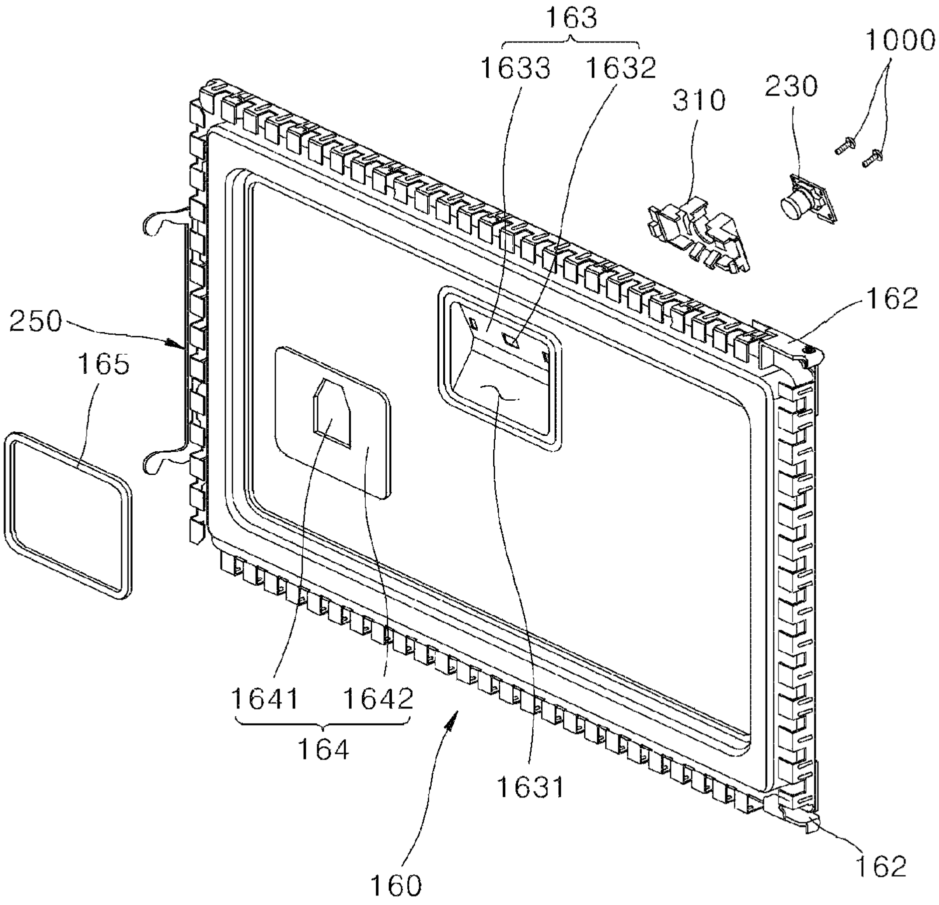
FIG. 17 is a view of FIG. 16 from another direction.
Figure 18:
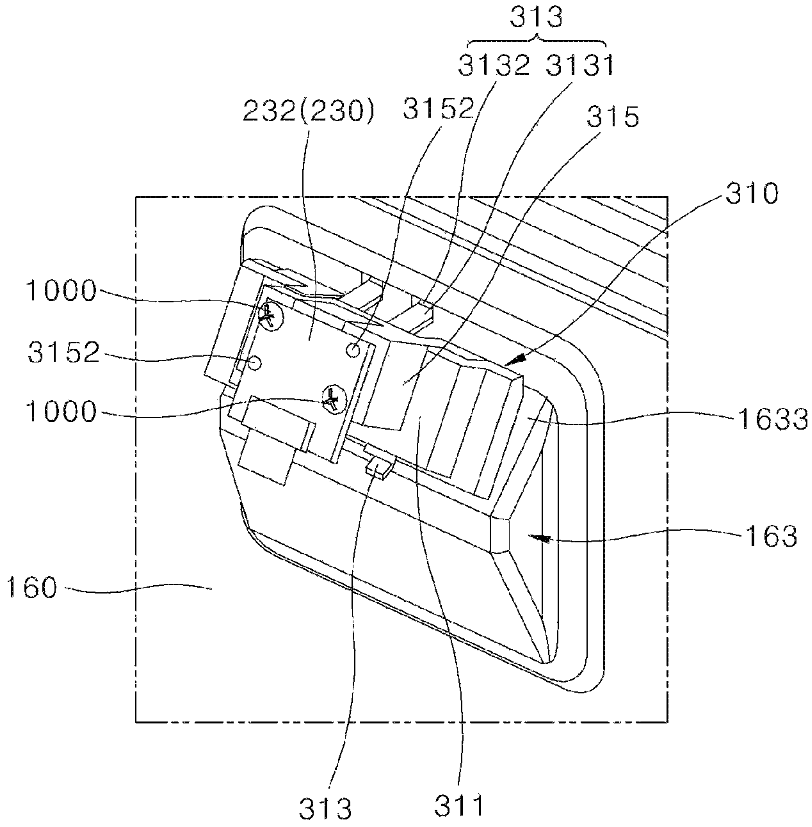
FIG. 18 is an enlarged view of a portion of the frame on which the third camera is mounted.
Figure 19:
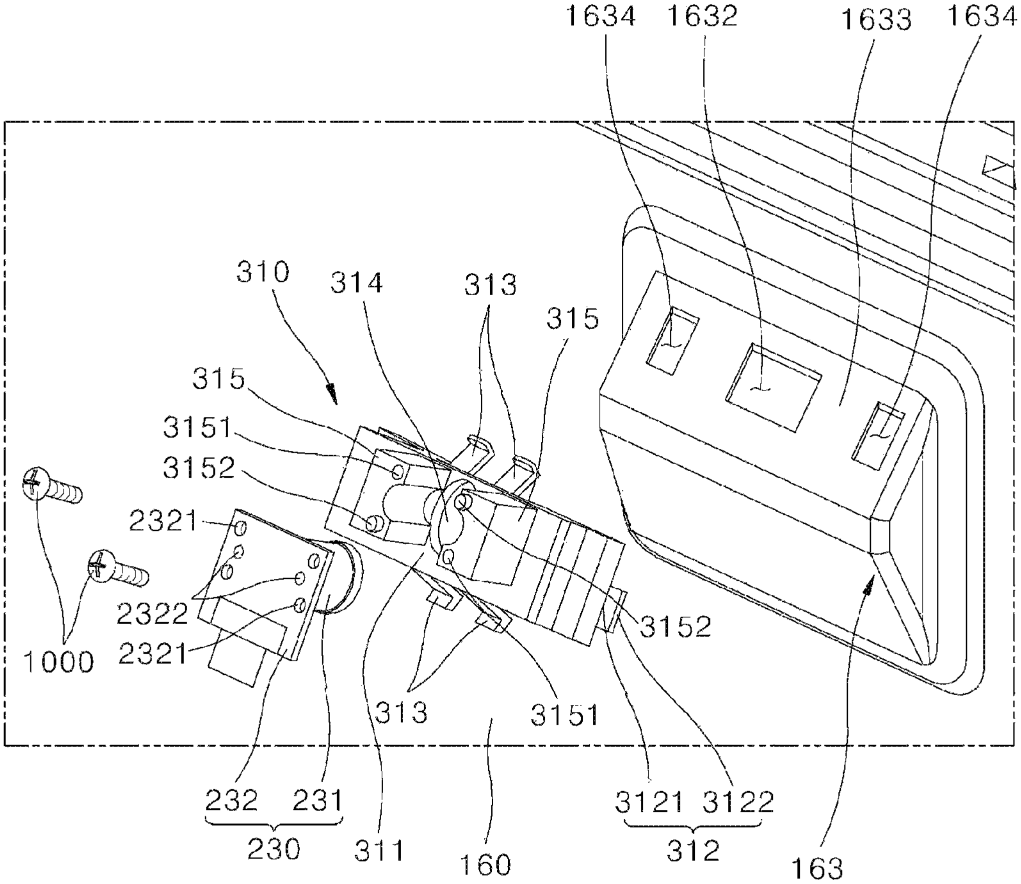
FIG. 19 is an exploded view of FIG. 18.

FIG. 16 is an exploded perspective view of FIG. 15. FIG. 17 is a view of FIG. 16 from another direction. FIG. 18 is an enlarged view of a portion of the frame 160 where the third camera 230 is mounted. FIG. 19 is an exploded view of FIG. 18.

The third camera 230 may be coupled to the supporter 310, for example, by a coupling mechanism 1000, such as a bolt.

Referring to FIGS. 16 and 17, the bracket 163 may have the opening 1631 formed at the rear, and may be provided so that a front protrudes and thus a space opened toward the cavity 11, that is, a space including the opening 1631 is formed.

The bracket 163 and the opened space may be formed by recessing the frame 160 toward the front of the door 20. The supporter 310 and the third camera 230 are mounted on a front surface of the bracket 163, and are not mounted in the opened space located on a rear surface of the bracket 163.

The rear surface of the bracket 163 may be recessed, and the front surface of the bracket 163 may protrude. The bracket 163 may include an angle adjustment unit 1633 forming a part of the protruding portion. The bracket 163 may be disposed on an upper portion of the bracket 163, on which the supporter 310 and the third camera 230 are mounted, and formed to be inclined with respect to the up-down direction of the frame 160. A surface of the angle adjusting unit 1633 may be provided as an inclined surface.

The supporter 310 and the third camera 230 may be mounted on the angle adjustment unit 1633. The third camera 230 may be mounted on the supporter 310. The supporter 310 may be mounted on one side surface of the angle adjustment unit 1633.

Accordingly, a through portion 1632 may be formed in the angle adjustment unit 1633 so that the gaze of the third camera 230 passes through the bracket 163. The gaze of the third camera 230 may be directed inside the cavity 11 through the through portion 1632.

The angle adjustment unit 1633 may be provided to have an inclination with respect to the front-rear direction of the door 20. Accordingly, the supporter 310 and the third camera 230 mounted on the angle adjustment unit 1633 may also be provided to be inclined with respect to the front-rear direction of the door 20. The gaze direction of the third camera 230 may also be disposed to be inclined with respect to the front-rear direction of the door 20.

Specifically, the gaze direction of the third camera 230 may form an acute angle with the front-rear direction of the door 20, and the third camera 230 may be provided to look down at the cavity 11 disposed behind the door 20.

The third camera 230 may be mounted at a location spaced upward from the center of the frame 160, and the gaze direction thereof may form an acute angle with the front-rear direction of the door 20. Accordingly, the third camera 230 may capture the food while looking in a downward direction at the food placed in the cavity 11.

Since the food is placed on a bottom surface of the cavity 11, the third camera 230 can effectively capture the food while looking down at the bottom surface of the cavity 11.

In the embodiment, since the third camera 230 captures the food while looking down at the food placed on the bottom surface of the cavity 11, it is possible to provide the user with an image of the food as a whole and more clearly. Accordingly, the user can conveniently and easily check the cooking situation of food through the captured image.

In the embodiment, the third camera 230 may be mounted on the bracket 163 formed on the frame 160 and may capture the cavity 11. The control unit provided in the cooking appliance may display images of the cooking situation of the food placed in the cavity 11 on the display unit 110. Accordingly, the user can conveniently check a situation in which food is being cooked through the display unit 110.

Figure 20:
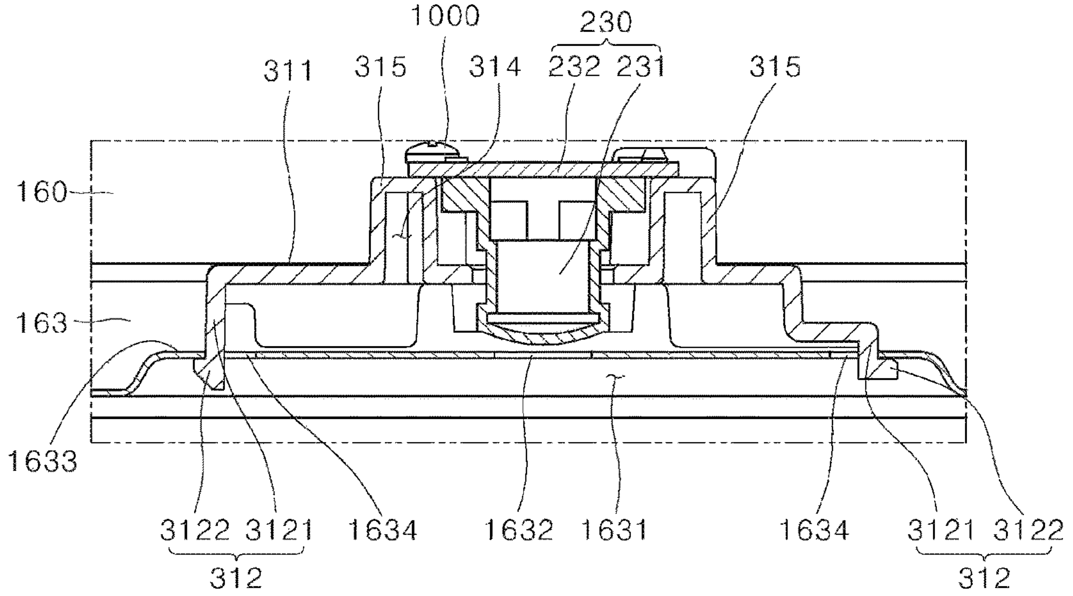
FIG. 20 is a cross-sectional view illustrating a state in which a supporter and the third camera are mounted on the frame according to an embodiment of the present disclosure.
Figure 21:
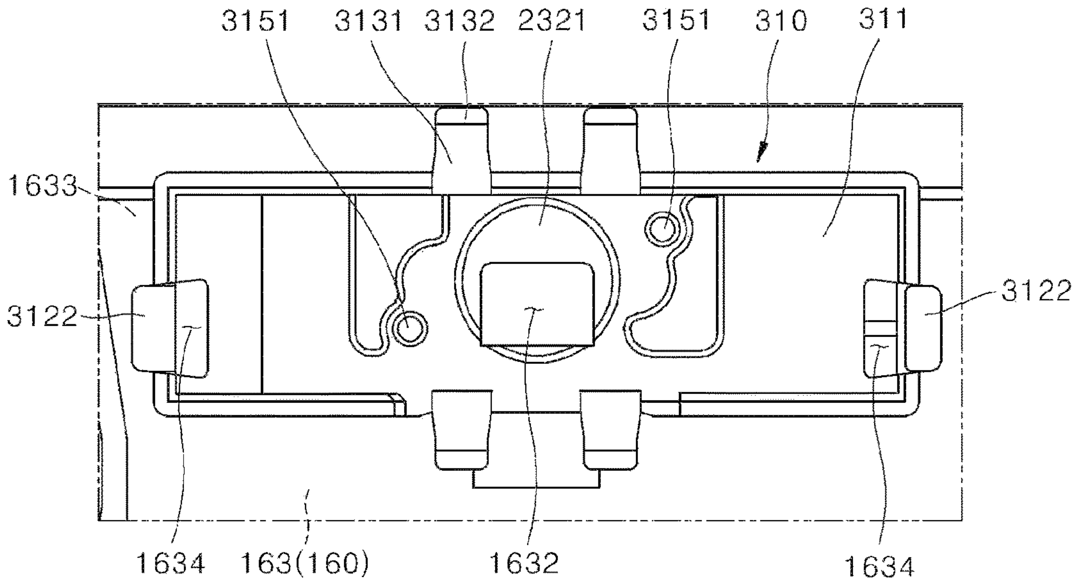
FIG. 21 is a rear view of FIG. 20.
Figure 22:
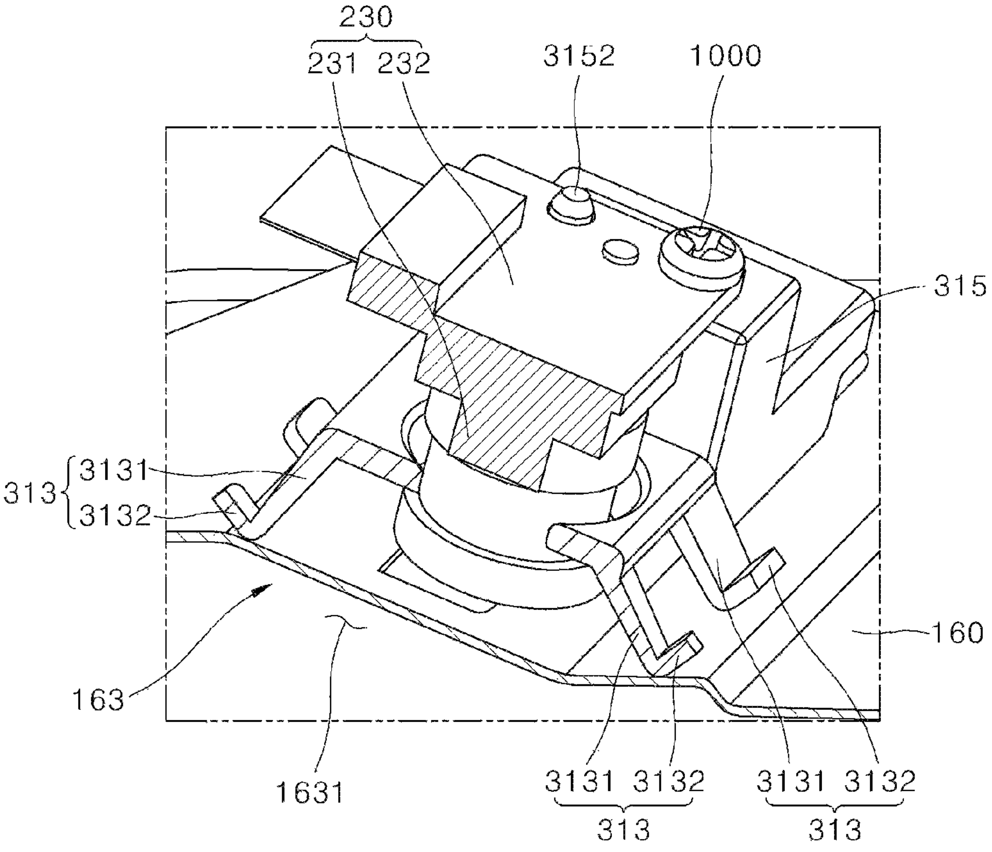
FIG. 22 is a cross-sectional perspective view illustrating the state in which the supporter and the third camera are mounted on the frame according to an embodiment of the present disclosure.

FIG. 20 is a cross-sectional view showing a state in which the supporter 310 and the third camera 230 are mounted on the frame according to one embodiment of the present disclosure. FIG. 21 is a rear view of FIG. 20. FIG. 22 is a cross-sectional perspective view showing the state in which the supporter 310 and the third camera 230 are mounted on the frame.

The supporter 310 may be mounted on the frame, and may support a camera for capturing the cavity 11. In the embodiment, the supporter 310 may support the third camera 230.

The third camera 230 may include a capturing unit 231 and a camera control module 232. The capturing unit 231 may capture images inside of the cavity 11. The capturing unit 231 may be provided in a structure in which a plurality of lenses are arranged, and disposed so that the gaze direction faces the cavity 11.

The camera control module 232 may be coupled to the capturing unit 231 and may control an operation of the capturing unit 231. The camera control module 232 may be provided as a printed circuit board including a circuit and various elements.

The supporter 310 may include a body 311, a mounting member 312, and a support member 313. The third camera 230 may be mounted on the body 311. The mounting member 312 may be formed to protrude from both sides of the body 311, and detachably mounted on the bracket 163.

The support member 313 may be formed to protrude from upper and lower ends of the body 311, and may support the supporter 310 by coming in contact with one surface of the frame. The mounting member 312 and the support member 313 may be disposed at locations that are substantially orthogonal to each other when viewed based on the body 311.

The mounting member 312 may include a first piece 3121 and a second piece 3122. The first piece 3121 may protrude from the body 311 and be elastically deformed when the mounting member 312 is detachably attached to the bracket 163.

The second piece 3122 may protrude from an end of the first piece 3121 and may prevent the mounting member 312 from being separated from the bracket 163 in a state in which the mounting member 312 is fitted into the bracket 163.

The bracket 163 may be formed with an insertion hole into which the mounting member 312 is inserted and fitted at locations corresponding to the first piece 3121 and the second piece 3122.

The second piece 3122 may be bent from the first piece 3121. When the supporter 310 and the third camera 230 are mounted on the bracket 163, the first piece 3121 may be pressed by the user and thus elastically deformed so that the second piece 3122 may be fitted into the insertion hole.

When the supporter 310 is completely mounted on the bracket 163, the first piece 3121 may return to its original shape and function as a stopper for preventing the supporter 310 from being separated from the insertion hole. Accordingly, the supporter 310 may be mounted on the bracket 163 without being separated from the bracket 163.

When the supporter 310 is removed from the bracket 163, the first piece 3121 may be pressed by the user and thus elastically deformed and a location of the second piece 3122 may be moved to move out of the insertion hole. Accordingly, the supporter 310 may be easily removed from the bracket 163.

The support member 313 may contact one surface of the bracket 163 to support the support member 313 so that the supporter 310 is in a state of coming in close contact with the bracket 163. The support member 313 may include a first part 3131 and a second part 3132.

The first part 3131 may protrude from the body 311 and be formed at a location spaced apart from the first piece 3121. The second part 3132 may be formed to be bent from the first part 3131.

When the supporter 310 is mounted on the bracket 163, the support member 313 may contact one surface of the bracket 163 on a portion where the first part 3131 and the second part 3132 are connected, thereby preventing the supporter 310 from shaking with respect to the bracket 163.

The first part 3131 may be pressed by the bracket 163 and thus elastically deformed to bring the supporter 310 into close contact with one surface of the bracket 163.

When the mounting member 312 is inserted into the insertion hole, the support member 313 may be in close contact with one surface of the bracket 163, and the first part 3131 may be pressed by the bracket 163 in contact with the mounting member 312. The first part 3131 may be elastically deformed by pressure to be in close contact with one surface of the bracket 163, and at this time, a pressing force may be provided between the support member 313 and the bracket 163, and the support member 313 and the bracket 163 may be in close contact with each other in a tighter manner by the pressing force.

Various external forces may be applied to the door 20 when the cooking appliance is operated. For example, at the moment when the door 20 is closed, there may be shock and vibration generated when the door 20 collides with the main body 10. Additionally, for example, there may be shock and vibration generated by the blowing device 150 mounted inside the door 20, a rotation device provided in the main body 10, etc.

In the state in which the support member 313 and the bracket 163 are in close contact with each other in a tight manner, the supporter 310 may be prevented from shaking due to an external force. Accordingly, the third camera 230 mounted on the supporter 310 may be prevented from shaking due to an external force, thereby improving the capturing quality of the third camera 230.

A camera insertion unit 314 formed to pass through the supporter 310 and having the third camera 230 inserted therein may be provided in the central portion of the supporter 310. The bracket 163 may be provided with a through portion formed to pass through the bracket 163 and formed at a location corresponding to the camera insertion unit 314.

Accordingly, the capturing unit 231 of the third camera 230 mounted on the camera insertion unit 314 may view the cavity 11 through the through portion, and capture the food placed in the cavity 11.

The supporter 310 may further include a module coupling unit 315 formed to protrude from both sides of the camera insertion unit 314, provided to surround at least a part of the capturing unit 231, and coupled to the camera control module 232. A pair of module coupling units 315 may be provided, and formed on both sides of the camera insertion unit 314, respectively.

The module coupling unit 315 may include a fastening hole 3151 and a coupling protrusion 3152. The coupling mechanism 1000 may be fastened to the fastening hole 3151. At least one fastening hole 3151 may be formed in the module coupling unit 315.

The coupling protrusion 3152 may be formed to protrude toward the camera control module 232, and disposed at a location spaced apart from the fastening hole 3151. At least one coupling protrusion 3152 may be formed in the module coupling unit 315.

The camera control module 232 may include a first hole 2321 and a second hole 2322. The first hole 2321 may be formed to protrude toward the camera control module 232, and disposed at a location spaced apart from the fastening hole 3151. The second hole 2322 may be provided at a location corresponding to the coupling protrusion 3152, and the coupling protrusion 3152 may be inserted into the second hole 2322. The first hole 2321 may be provided in a number corresponding to the fastening hole 3151, and the second hole 2322 may be provided in a number corresponding to the coupling protrusion 3152.

First, the coupling protrusion 3152 may be inserted into the second hole 2322. Next, the coupling mechanism 1000, such as a bolt, may be inserted into and fastened to the fastening hole 3151 of the module coupling unit 315 and the first hole 2321 of the camera control module 232.

By coupling the camera module to the module coupling unit 315 using the coupling protrusion 3152 and the coupling mechanism 1000 disposed at locations spaced apart from each other, the third camera 230 including the camera module may be easily coupled to the supporter 310.

In addition, this structure allows the third camera 230 to be stably mounted on the supporter 310 so as not to be rotated with respect to the supporter 310 due to external shock or vibration.

The supporter 310 may be provided with the mounting member 312 and the support member 313 disposed at the locations spaced apart from each other. The mounting member 312 may be provided to be easily detachable from the bracket 163 of the frame. The support member 313 can bring the supporter 310 into close contact with the bracket 163 of the frame to support the support member 313, thereby suppressing the support member 313 from shaking due to external vibration.

Accordingly, the supporter 310 can be easily detached from the frame, thereby easily performing the task of mounting the third camera 230 on the frame, or during replacement or repair work. In addition, it is possible to suppress the third camera 230 from shaking due to external vibration in the state in which the third camera 230 is mounted on the frame, thereby improving the capturing quality of the third camera 230.

Embodiments of the present disclosure are described with reference to the accompanying drawings. The disclosure may, however, be embodied in many different manners and should not be construed as limited to the embodiments set forth herein. It is understood that a person having ordinary skill in the art to which the present disclosure art would implement this disclosure in other specific manners without changing the technical idea or necessary features of the present disclosure. For this reason, the disclosed embodiments are intended to be illustrative in all aspects, and not restrictive.

What is claimed is:

1. A cooking appliance, comprising:
a main body having a cavity; and
a door to open and close the cavity,
wherein the door comprises:
a display module disposed on a front surface of the door;
a shielding unit disposed behind the display module to block electromagnetic waves generated in the main body, the shielding unit comprising a frame having one side rotatably coupled to the main body;
a support detachably mounted to the frame; and
a third camera mounted on the support and disposed to capture a state of the cavity,
wherein the support comprises:
a body on which the third camera is mounted;
a mounting member that protrudes from both sides of the body, the mounting member being detachably mounted to the frame; and
a support member that protrudes from upper and lower ends of the body, the support member being in contact with one surface of the frame to hold the support.

2. The cooking appliance of claim 1, wherein the door further comprises:
a first camera mounted on a lower portion of the display module and disposed to capture a state of a lower portion of the door; and
a second camera disposed on an upper portion of the door and disposed to capture a state of an area in front of the door.

3. The cooking appliance of claim 1, wherein the frame comprises:
a bracket disposed at a location spaced upward from a center of the frame, the bracket having an opening and a three-dimensional shape to adjust a gaze direction of the third camera;
a window mounted in the opening of the bracket; and
a seal to close a gap between the opening and the window.

4. The cooking appliance of claim 3, wherein the window comprises:
a capturing region that is transparent and formed in a central portion thereof, and
a masking region that is opaque and surrounds the capturing region.

5. The cooking appliance of claim 4, wherein the masking region comprises an opaque ink or an opaque film.

6. The cooking appliance of claim 3, wherein the opening is formed at a rear side of the bracket, the bracket having a front side that protrudes to form a space opened toward the cavity.

7. The cooking appliance of claim 6, wherein the bracket comprises an angle adjuster configured to be inclined with respect to an up-down direction of the frame, the angle adjuster disposed on an upper portion of the bracket and on which the support and the third camera are mounted.

8. The cooking appliance of claim 7, wherein the support is mounted on one side surface of the angle adjuster.

9. The cooking appliance of claim 8, wherein the gaze direction of the third camera forms an acute angle with a front-rear direction of the door, the third camera provided to look down at the cavity.

10. The cooking appliance of claim 1, wherein the mounting member comprises:
a first piece that protrudes from the body, the first piece configured to elastically deform when the mounting member is detachably attached to the bracket; and
a second piece that protrudes from an end of the first piece, the second piece configured to prevent the mounting member from being separated from the bracket when the mounting member is fitted into the bracket.

11. The cooking appliance of claim 10, wherein the bracket comprises an insertion hole into which the mounting member is inserted and fitted at locations corresponding to the first piece and the second piece.

12. The cooking appliance of claim 10, wherein the support member comprises:
a first part that protrudes from the body and is disposed at a location spaced apart from the first piece; and
a second part that is bent from the first part.

13. A cooking appliance, comprising:

a main body having a cavity; and a door to open and close the cavity, wherein the door comprises:

a display module disposed on a front surface of the door;

a shielding unit disposed behind the display module to block electromagnetic waves generated in the main body, the shielding unit comprising a frame having one side rotatably coupled to the main body; and a support that is mounted on the frame and holds a third camera configured to capture a state of the cavity, wherein the display module comprises:

a display unit to visually present a video or an image;

an outer panel disposed behind the display unit and on which the display unit is mounted;

a baffle that is disposed in front of the display unit and surrounds an edge of the display unit the baffle being coupled to the outer panel to mount the display unit on the outer panel; and a front cover that is disposed in front of the baffle and surrounds an edge of the baffle.

14. The cooking appliance of claim 13, wherein the door further comprises:

a first camera mounted on a lower portion of the outer panel to capture a state of a lower portion of the door; and a second camera disposed on an upper portion of the door to capture a state of an area in front of the door, the second camera mounted to the door by passing through the baffle and the front cover;

wherein the third camera is mounted on the support and is disposed to face the cavity.

15. The cooking appliance of claim 14, wherein the third camera comprises:

a capturing unit to capture the state of the cavity; and a camera control module coupled to the capturing unit, the camera control module to control an operation of the capturing unit.

16. The cooking appliance of claim 15, wherein the frame comprises:

a bracket disposed at a location spaced upward from a center of the frame, the bracket having an opening and a three-dimensional shape to adjust a gaze direction of the third camera;

a window mounted in the opening of the bracket; and a seal configured to close a gap between the opening and the window.

* * * * *